United States Patent
Choi et al.

(10) Patent No.: US 12,418,612 B2
(45) Date of Patent: Sep. 16, 2025

(54) ELECTRONIC DEVICE FOR CHANGING OPERATION OF WIRELESS COMMUNICATION BASED ON CHANGE OF ANGLE OF HOUSING AND METHOD THEREFOR

(71) Applicant: SAMSUNG ELECTRONICS CO., LTD., Suwon-si (KR)

(72) Inventors: Junsu Choi, Suwon-si (KR); Hyeonu Choi, Suwon-si (KR); Sunghwan Kim, Suwon-si (KR); Hyunkee Min, Suwon-si (KR); Junhak Lim, Suwon-si (KR); Kiyeong Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 380 days.

(21) Appl. No.: 18/071,927

(22) Filed: Nov. 30, 2022

(65) Prior Publication Data

US 2023/0126559 A1   Apr. 27, 2023

Related U.S. Application Data

(63) Continuation of application No. PCT/KR2022/015891, filed on Oct. 18, 2022.

(30) Foreign Application Priority Data

Oct. 22, 2021   (KR) .......... 10-2021-0141553
Oct. 18, 2022   (KR) .......... 10-2022-0134245

(51) Int. Cl.
*H04M 1/02*   (2006.01)
*H04M 1/72454*   (2021.01)

(52) U.S. Cl.
CPC ..... *H04M 1/72454* (2021.01); *H04M 1/0216* (2013.01)

(58) Field of Classification Search
CPC ............ H04M 1/0243; H04M 1/0268; H04M 1/0241; H04M 1/72454; H04M 1/0216
See application file for complete search history.

(56) References Cited

U.S. PATENT DOCUMENTS 10,148,304 B2 * 12/2018 Chang ................ H04W 52/367
10,833,392 B1    11/2020 Zekios et al.
(Continued)

FOREIGN PATENT DOCUMENTS

CN    112436265 A  *  3/2021  ............... H01Q 1/22
JP    2019-57756 A     4/2019
(Continued)

OTHER PUBLICATIONS

Communication dated Oct. 25, 2024, issued by the European Patent Office in European Application No. 22883996.5.
(Continued)

*Primary Examiner* — Angelica Perez
(74) *Attorney, Agent, or Firm* — Sughrue Mion, PLLC

(57) ABSTRACT

An electronic device includes: a hinge structure; a foldable housing including a first housing structure and a second housing structure that are configured to be foldable relative to each other around the hinge structure; a first antenna provided in the first housing structure; a second antenna provided in the second housing structure; a communication circuit electrically connected to the first antenna and the second antenna, and configured to transmit and receive data through a first link and a second link established between an external electronic device and the electronic device; and a processor operatively connected to the communication circuit, wherein the processor is configured to: identify whether an angle between the first housing structure and the second housing structure satisfies a specified condition; and control the communication circuit to transmit, through at least one of the first link and the second link, a signal related to a (Continued)

change in an operation of short-range wireless communication, based on whether the angle satisfies the specified condition.

20 Claims, 18 Drawing Sheets

(56) References Cited

U.S. PATENT DOCUMENTS

| | | | |
|---|---|---|---|
| 11,158,929 B2 | 10/2021 | Shi et al. | |
| 2006/0118625 A1* | 6/2006 | Sekita | G06F 1/1677 |
| | | | 235/451 |
| 2021/0014811 A1 | 1/2021 | Seok et al. | |
| 2021/0075459 A1 | 3/2021 | Noh et al. | |
| 2021/0076398 A1 | 3/2021 | Naribole et al. | |
| 2021/0168227 A1 | 6/2021 | Jung et al. | |
| 2021/0218137 A1* | 7/2021 | Zhu | H01Q 1/44 |
| 2021/0344783 A1 | 11/2021 | Jeong et al. | |
| 2022/0109472 A1 | 4/2022 | Na et al. | |
| 2022/0166132 A1* | 5/2022 | Chu | H04B 1/0064 |
| 2022/0167444 A1 | 5/2022 | Jang et al. | |
| 2022/0286542 A1* | 9/2022 | Seo | H01Q 1/2283 |
| 2022/0303997 A1 | 9/2022 | Aio et al. | |
| 2023/0004195 A1 | 1/2023 | Hase | |
| 2023/0231297 A1* | 7/2023 | Kim | H04B 7/0413 |
| | | | 455/73 |
| 2024/0030607 A1* | 1/2024 | Zhou | G06F 1/1616 |

FOREIGN PATENT DOCUMENTS

| | | |
|---|---|---|
| KR | 10-2020-0024500 A | 3/2020 |
| KR | 10-2020-0121199 A | 10/2020 |
| KR | 10-2020-0144772 A | 12/2020 |
| KR | 10-2021-0031309 A | 3/2021 |
| WO | 2019/062891 A1 | 4/2019 |
| WO | 2021/002618 A1 | 1/2021 |
| WO | 2021/090718 A1 | 5/2021 |
| WO | 2021/192729 A1 | 9/2021 |

OTHER PUBLICATIONS

International Search Report & Written Opinion (PCT/ISA/210 & PCT/ISA/237) issued Jan. 25, 2023 by the International Searching Authority in International Application No. PCT/KR2022/015891.

* cited by examiner

ELECTRONIC DEVICE FOR CHANGING OPERATION OF WIRELESS COMMUNICATION BASED ON CHANGE OF ANGLE OF HOUSING AND METHOD THEREFOR

CROSS-REFERENCE TO RELATED APPLICATIONS

This application is a continuation application of International Application No. PCT/KR2022/015891, filed on Oct. 18, 2022, which is based on and claims priority to Korean Patent Application No. 10-2022-0134245, filed on Oct. 18, 2022, and Korean Patent Application No. 10-2021-0141553, filed on Oct. 22, 2021, in the Korean Intellectual Property Office, the disclosures of which are incorporated by reference herein in their entireties.

BACKGROUND

1. Field

The disclosure relates to an electronic device and a method of operating an electronic device, and more particularly, to changing an operation of a wireless communication, based on a change in an angle of a housing.

2. Description of Related Art

In line with proliferation of various electronic devices, improvement of speed for wireless communication that may be used by various electronic devices has been implemented. Among wireless communications supported by related electronic devices, Institute of Electrical and Electronics Engineers (IEEE) 802.11 wireless local-area network (WLAN) (e.g., Wireless-Fidelity (Wi-Fi)) is a communications standard for implementing high-speed wireless connection of various electronic devices. The first implemented Wi-Fi could support a transmission rate of up to 1 to 9 Mbps, and Wi-Fi 6 technology (or IEEE 802.11 ax) can support a transmission rate of up to about 10 Gbps.

A related electronic device may support various services (e.g., ultra high definition (UHD) video streaming services, augmented reality (AR) services, virtual reality (VR) services, or mixed reality (MR) services) using a large amount of data through wireless communication supporting a high transmission rate, and support various other services.

In the IEEE 802.11 WLAN standard, a technology supporting a multi-link operation (MLO) is scheduled to be introduced in order to improve data transmission/reception speed and reduce delay time. Electronic devices supporting MLO may transmit or receive data through a plurality of links, and thus are expected to be able to implement a higher transmission rate and a lower latency.

The IEEE 802.11 WLAN standard is considering a method of supporting a non-station (non-STA) mode or an enhanced multi-link single-radio (EMLSR) mode in which when data is transmitted to an external electronic device through one link, data is not received through another link in consideration of interference occurring between links due to a limited mounting space of the electronic device.

Furthermore, in recent years, an electronic device (e.g., a foldable device) having a flexible display to be bent and capable of being folded or an electronic device (e.g., a rollable device or a slidable device) capable of enlarging a display in a slide manner have been popular.

In an electronic device, a plurality of antennas may be disposed in different housings in order to improve the performance of short-range wireless communication (e.g., Wi-Fi). As a distance between the plurality of antennas increases, interference due to signals output or received by the antennas may be reduced, thereby improving the performance of short-range wireless communication.

However, in the case where an electronic device is implemented using a foldable housing (or a rollable housing), the distance between the antennas may change as an angle of the housing changes (or the degree to which the housing slides in changes). For example, when the electronic device is fully folded (or when the electronic device is in a fully slide-in state), the distance between the antennas may be reduced.

When the distance between the antennas is reduced, maintaining the operation of short-range wireless communication capable of implementing a low delay time and/or a high transmission or reception rate (e.g., simultaneous transmission and reception (STR) or high-level modulation coding scheme (MCS)) may not attain a required transmission (or reception) rate and delay time.

SUMMARY

According to an aspect of the disclosure, an electronic device includes: a hinge structure; a foldable housing including a first housing structure and a second housing structure that are configured to be foldable relative to each other around the hinge structure; a first antenna provided in the first housing structure; a second antenna provided in the second housing structure; a communication circuit electrically connected to the first antenna and the second antenna, and configured to transmit and receive data through a first link and a second link established between an external electronic device and the electronic device; and a processor operatively connected to the communication circuit, wherein the processor is configured to: identify whether an angle between the first housing structure and the second housing structure satisfies a specified condition; and control the communication circuit to transmit, through at least one of the first link and the second link, a signal related to a change in an operation of short-range wireless communication, based on whether the angle satisfies the specified condition.

The processor may be further configured to: select a mode from among a first mode in which data is transmitted through the first link and in which data is received through the second link, and a second mode in which data is prevented from being received through the second link while transmitting data through the first link, based on identifying that the angle satisfies the specified condition; and control the communication circuit to transmit, through the at least one of the first link and the second link, the signal including information indicating the selected mode.

The processor may be further configured to control the communication circuit to transmit, through the at least one of the first link and the second link, a changed signal including information indicating a changed selected mode, based on changing the selected mode to the changed selected mode.

The processor may be further configured to change a modulation and coding scheme (MCS) of the at least one of the first link and the second link, based on identifying that the angle satisfies the specified condition.

The processor may be further configured to change a bandwidth of the at least one of the first link and the second link, based on identifying that the angle satisfies the specified condition.

The specified condition may include a condition related to a distance between the first antenna and the second antenna.

The processor may be further configured to determine whether to transmit the signal, based on whether a difference between a first frequency band corresponding to the first link and a second frequency band corresponding to the second link is greater than or equal to a specified value.

The processor may be further configured to prevent transmission of the signal, based on identifying that the difference between the first frequency band and the second frequency band is greater than or equal to the specified value.

The processor may be further configured to prevent transmission of the signal, based on identifying that the difference between the first frequency band corresponding to the first link and the second frequency band is less than the specified value and identifying that the angle satisfies the specified condition.

A distance between the first antenna and the second antenna may change according a change in the angle between the first housing structure and the second housing structure due to the first housing structure and the second housing structure being folded or unfolded about the hinge structure.

According to an aspect of the disclosure, a method of operating an electronic device, including a first housing structure and a second housing structure that are configured to be foldable relative to each other, a first antenna provided in the first housing structure, and a second antenna provided in the second housing structure, includes: identifying whether an angle between the first housing structure and the second housing structure satisfies a specified condition; and transmitting a signal related to a change in an operation of short-range wireless communication established between an external electronic device and the electronic device through at least one of a first link and a second link, based on whether the angle satisfies the specified condition.

The method may further include: selecting a mode from among a first mode in which data is transmitted through the first link and in which data is received through the second link, and a second mode in which data is prevented from being received through the second link while transmitting data through the first link, based on identifying that the angle satisfies the specified condition; and transmitting, through the at least one of the first link and the second link, the signal including information indicating the selected mode.

The method may further include transmitting, through the at least one of the first link and the second link, a changed signal including information indicating a changed selected mode, based on changing the selected mode to the changed selected mode.

The method may further include changing a modulation and coding scheme (MCS) of the at least one of the first link and the second link, based on identifying that the angle satisfies the specified condition.

The method may further include changing a bandwidth of the at least one of the first link and the second link, based on identifying that the angle satisfies the specified condition.

The specified condition may include a condition related to a distance between the first antenna and the second antenna.

The method may further include determining whether to transmit the signal, based on whether a difference between a first frequency band corresponding to the first link and a second frequency band corresponding to the second link is greater than or equal to a specified value.

The determining of whether to transmit the signal may include preventing transmission of the signal, based on identifying that the difference between the first frequency band and the second frequency band is greater than or equal to the specified value.

The determining of whether to transmit the signal may include preventing transmission of the signal, based on identifying that the difference between the first frequency band and the second frequency band is less than the specified value and identifying that the angle satisfies the specified condition.

A distance between the first antenna and the second antenna may change according a change in the angle between the first housing structure and the second housing structure due to the first housing structure and the second housing structure being folded or unfolded about a hinge structure of the electronic device.

In an electronic device and a method of operating an electronic device according to various embodiments of the disclosure, the electronic device may transmit, to an external electronic device, a signal for changing the operation of short-range wireless communication if an angle between a first housing structure and a second housing structure satisfies a specified condition. An electronic device and an operation method of an electronic device may perform an operation (e.g., non-STR, low-level MCS, or low-performance operation mode) corresponding to the state in which a required distance between antennas is relatively small in the state in which a foldable housing is folded (or when a rollable housing is in a slide-in state), thereby preventing (or reducing) degradation of short-range wireless communication that may be caused when the foldable housing is folded.

Alternatively or additionally, an electronic device and an operation method of an electronic device may perform an operation (e.g., STR, high-level MCS, or high-performance operation mode) corresponding to the state in which a required distance between antennas is relatively large in the state in which a foldable housing is unfolded (or when a rollable housing is in a slide-out state), thereby improving the performance of short-range wireless communication.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a diagram illustrating an embodiment in which an electronic device according to various embodiments of the disclosure changes the operation of short-range wireless communication, based on the degree to which a second housing structure slides in;

DETAILED DESCRIPTION

Figure 1:
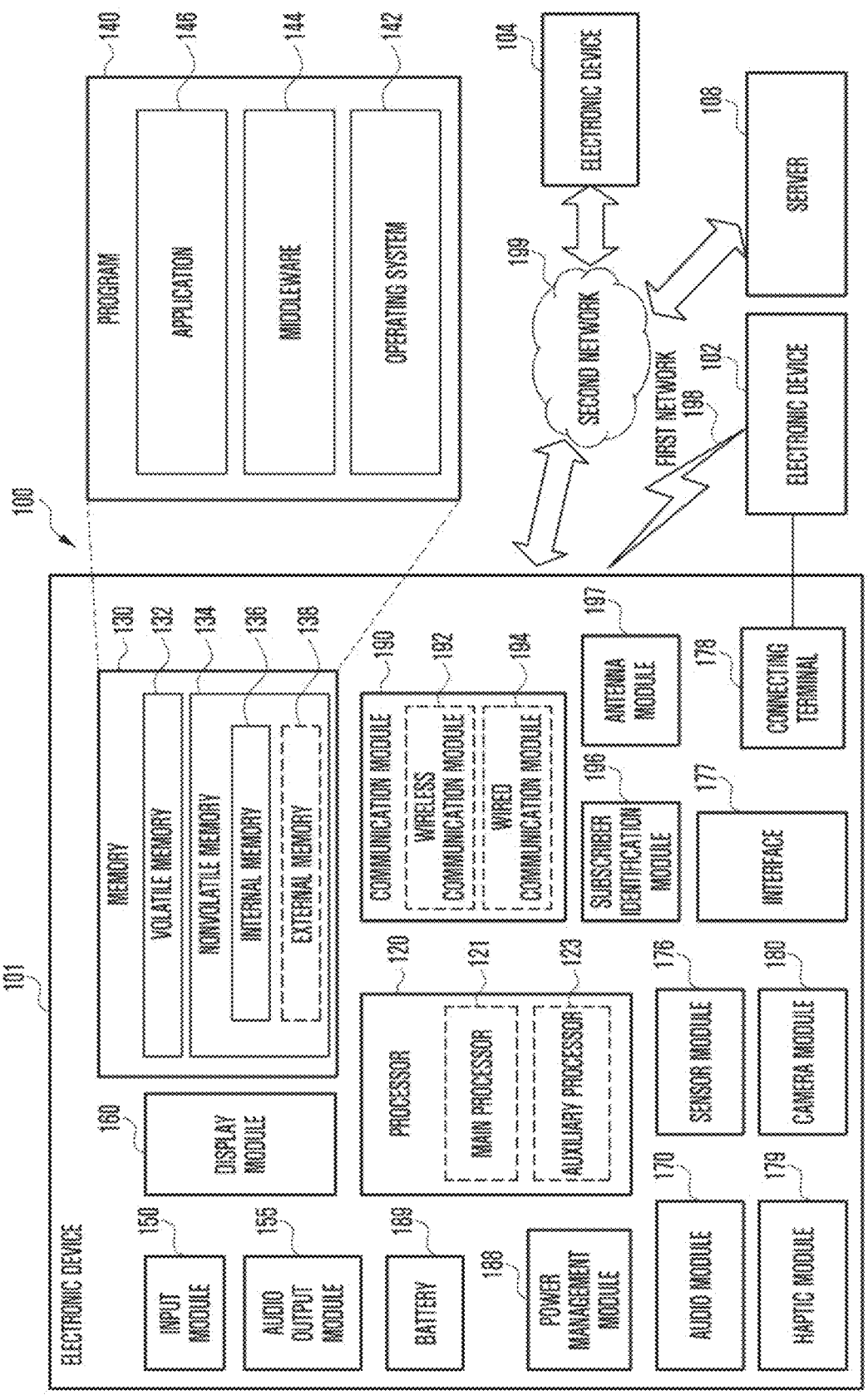
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
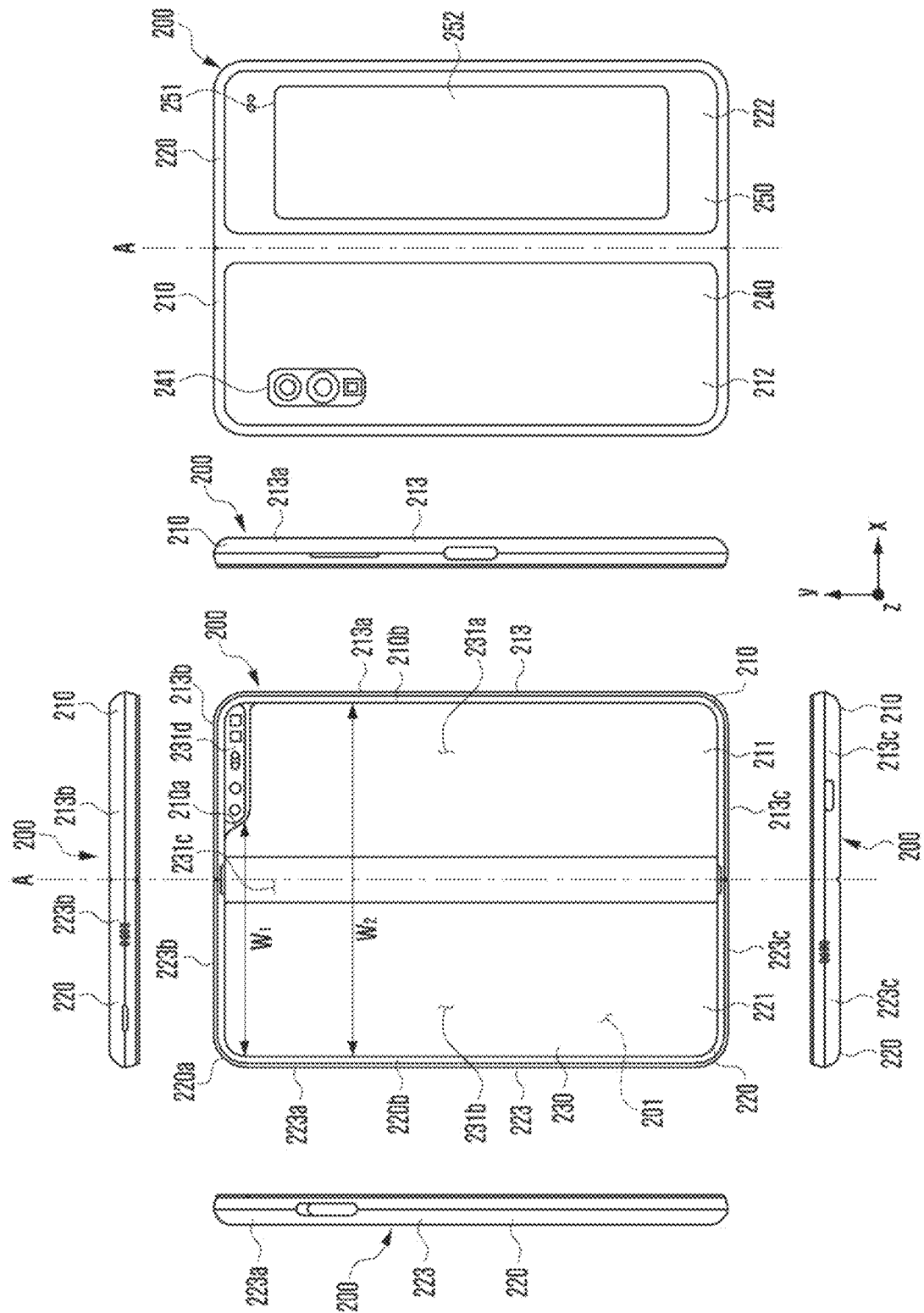
FIG. 2A is a diagram illustrating an unfolded state of an electronic device including a foldable housing according to various embodiments of the disclosure.
Figure 2B:
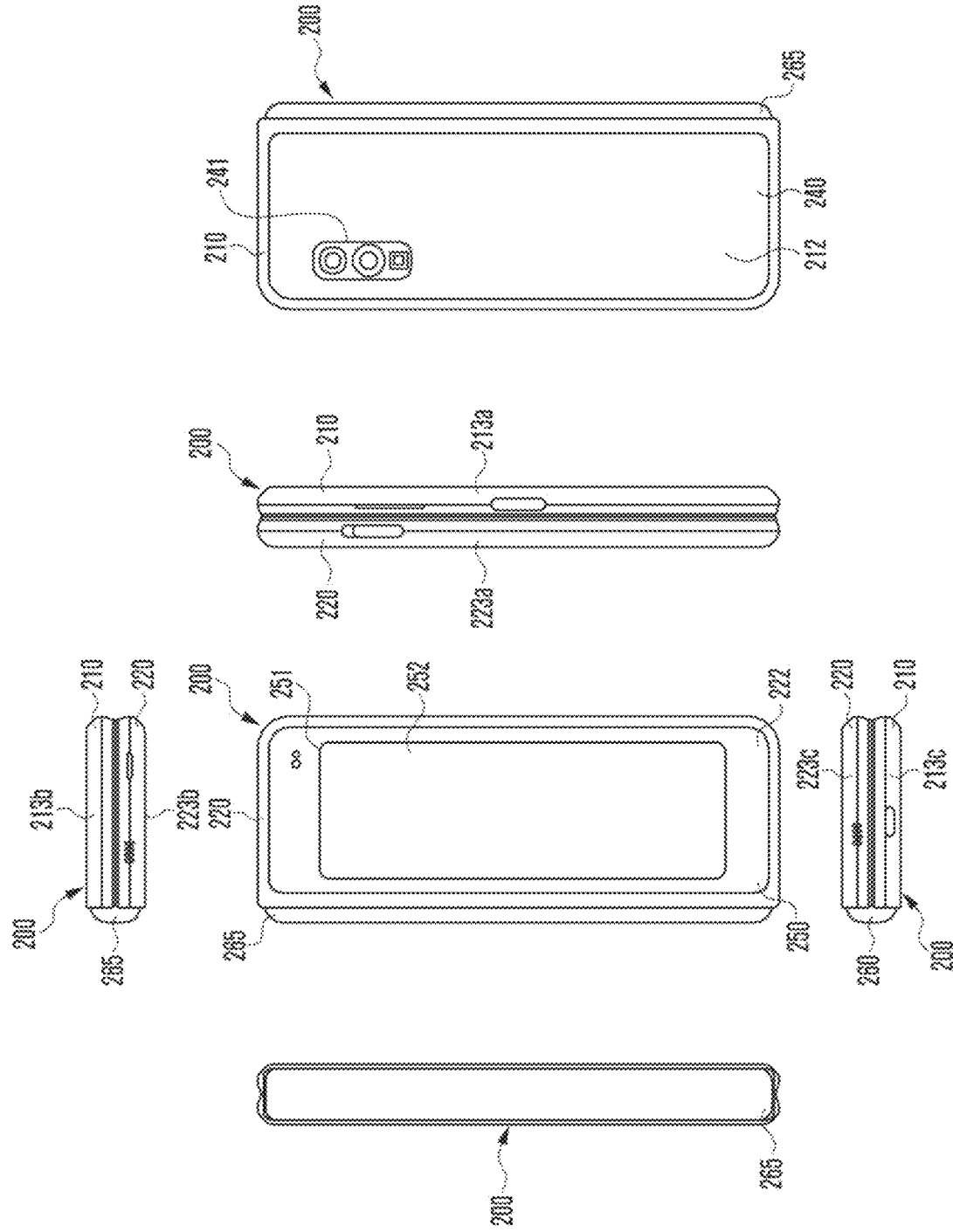
FIG. 2B is a diagram illustrating a folded state of an electronic device including a foldable housing according to various embodiments of the disclosure.

FIG. 2A is a diagram illustrating an unfolded state of an electronic device 200 according to various embodiments of the disclosure. FIG. 2B is a diagram illustrating a folded state of the electronic device 200 in FIG. 2A according to various embodiments of the disclosure.

The electronic device 200 in FIGS. 2A and 2B may be at least partially similar to the electronic device 101 in FIG. 1, or may include other embodiments of the electronic device.

Referring to FIG. 2A, the electronic device 200 may include a pair of housing structures 210 and 220 rotatably coupled through a hinge structure (e.g., the hinge structure 264 in FIG. 3) to be folded relative to each other, a hinge cover 265 for covering foldable portions of the pair of housing structures 210 and 220, and a display 230 (e.g., a flexible display or a foldable display) disposed in a space formed by the pair of housing structures 210 and 220. In the present disclosure, the surface on which the display 230 is disposed may be referred to as a front surface of the electronic device 200, and the opposite surface of the front surface may be referred to as a rear surface of the electronic device 200. Alternatively or additionally, the surface surrounding a space between the front surface and the rear surface may be referred to as a side surface of the electronic device 200.

In an embodiment, the pair of housing structures 210 and 220 may include a first housing structure 210 including a sensor area 231d, a second housing structure 220, a first rear cover 240, and a second rear cover 250. The pair of housing structures 210 and 220 of the electronic device 200 is not limited to the shapes and coupling shown in FIGS. 2A and 2B, and may be implemented by a combination and/or coupling of other shapes or components. For example, in another embodiment, the first housing structure 210 and the first rear cover 240 may be integrally formed, and the second housing structure 220 and the second rear cover 250 may be integrally formed.

According to an embodiment, the first housing structure 210 and the second housing structure 220 may be disposed on both sides of a folding axis (e.g., axis A) and/or have an overall symmetrical shape with respect to the folding axis (e.g., axis A). According to an embodiment, the angle or distance between the first housing structure 210 and the second housing structure 220 may vary depending on an unfolded state (flat state or closed state), a folded state, or an intermediate state of the electronic device 200. According to an embodiment, the first housing structure 210, unlike the second housing structure 220, may further include a sensor area 231d in which various sensors are disposed but have a symmetrical shape in other areas. In another embodiment, the sensor placement area 231d may be further disposed in at least a partial area of the second housing structure 220 or may be replaced therewith.

In an embodiment, the first housing structure 210 may be connected to a hinge structure (not shown) in the unfolded state of the electronic device 200 and include a first surface 211 disposed to face the front surface of the electronic device 200, a second surface 212 facing in the opposite direction of the first surface 211, and a first side member 213 surrounding at least a portion of a space between the first surface 211 and the second surface 212. In an embodiment, the first side member 213 may include a first side surface 213a disposed parallel to the folding axis (e.g., axis A), a second side surface 213b extending from one end of the first side surface 213a in a direction perpendicular to the folding axis, and a third side surface 213c extending from the opposite end of the first side surface 213a in a direction perpendicular to the folding axis (e.g., axis A).

In an embodiment, the second housing structure 220 may be connected to the hinge structure (e.g., the hinge structure 264 in FIG. 3) in the unfolded state of the electronic device 200 and include a third surface 221 disposed to face the front surface of the electronic device 200, a fourth surface 222 facing in the opposite direction of the third surface 221, and a second side member 223 surrounding at least a portion of a space between the third surface 221 and the fourth surface 222. In an embodiment, the second side member 223 may include a fourth side surface 223a disposed parallel to the folding axis (e.g., axis A), a fifth side surface 223b extending from one end of the fourth side surface 223a in a direction perpendicular to the folding axis (e.g., axis A), and a sixth side surface 223c extending from the opposite end of the fourth side surface 223a in a direction perpendicular to the folding axis (e.g., axis A). In an embodiment, the third surface 221 may face the first surface 211 in the folded state.

In an embodiment, the electronic device 200 may include a recess 201 formed to receive the display 230 through structural shape coupling of the first housing structure 210 and the second housing structure 220. The recess 201 may have substantially the same size as the display 230. In an embodiment, the recess 201 may have two or more different widths in a direction perpendicular to the folding axis (e.g., axis A) due to the sensor area 231d. For example, the recess 201 may have a first width W1 between a first portion 220a of the second housing structure 220, which is parallel to the folding axis (e.g., axis A), and a first portion 210a of the first housing structure 210, which is formed on the periphery of the sensor area 231d, and a second width W2 formed between a second portion 220b of the second housing structure 220 and a second portion 210b of the first housing structure 210, which does not belong to the sensor area 213d and is parallel to the folding axis (e.g., axis A). In this case, the second width W2 may be formed to be greater than the first width Wi. For example, the recess 201 may have a first width Wi formed between a first portion 210a of the first housing structure 210, which has an asymmetric shape, and a first portion 220a of the second housing structure 220, and a second width W2 formed between a second portion 210b of the first housing structure 210, which has a symmetrical shape, and a second portion 220b of the second housing structure 220. In an embodiment, the first portion 210a and the second portion 210b of the first housing structure 210 may be formed to have different distances from the folding axis (e.g., axis A). The widths of the recess 201 are not limited to the illustrated example. In various embodiments, the recess 201 may have at least two different widths due to the shape of the sensor area 213d or the asymmetric portions of the first housing structure 210 and the second housing structure 220.

In an embodiment, at least a portion of the first housing structure 210 and the second housing structure 220 may be formed of a metal material or a non-metal material having a rigidity selected to support the display 230.

In an embodiment, the sensor area 231d may be formed adjacent to one corner of the first housing structure 210 to have a predetermined area. However, the arrangement, shape, or size of the sensor area 231d is not limited to the illustrated example. For example, in another embodiment, the sensor area 231d may be provided at another corner or any area between the top and bottom corners of the first housing structure 210. In another embodiment, the sensor area 231d may be disposed in at least a partial area of the second housing structure. In another embodiment, the sensor area 231d may be disposed to extend to the first housing structure 210 and the second housing structure 220. In an embodiment, the electronic device 200 may include components performing various functions, which are disposed to be exposed to the front surface of the electronic device 200 through the sensor area 213d or one or more openings provided in the sensor area 231d. In various embodiments, the components may include, for example, at least one of a front camera device, a receiver, a proximity sensor, an illuminance sensor, an iris recognition sensor, an ultrasonic sensor, or an indicator.

In an embodiment, the first rear cover 240 may be disposed in the second surface 212 of the first housing structure 210 and may have a substantially rectangular periphery. In an embodiment, at least a portion of the periphery may be surrounded by the first housing structure 210. Similarly, the second rear cover 250 may be disposed in the fourth surface 222 of the second housing structure 220, and at least a portion of its periphery may be surrounded by the second housing structure 220.

Continuing to refer to FIG. 2A, the first rear cover 240 and the second rear cover 250 may have a substantially symmetrical shape with respect to the folding axis (e.g., axis A). In another embodiment, the first rear cover 240 and the second rear cover 250 may include various shapes different from each other. In another embodiment, the first rear cover 240 may be integrally formed with the first housing structure 210, and the second rear cover 250 may be integrally formed with the second housing structure 220.

In an embodiment, the first rear cover 240, the second rear cover 250, the first housing structure 210, and the second housing structure 220 may be coupled to each other in a structure providing a space in which various components (e.g., a printed circuit board, an antenna module, a sensor module, or a battery) of the electronic device 200 may be disposed. In an embodiment, one or more components may be disposed on the rear surface of the electronic device 200 or may be visually exposed therethrough. For example, one or more components or sensors may be visually exposed through a first rear surface area 241 of the first rear cover 240. In various embodiments, the sensors may include a proximity sensor, a rear camera device, and/or a flash. In another embodiment, at least a portion of a sub-display 252 may be visually exposed through a second rear surface area 251 of the second rear cover 250.

The display 230 may be disposed in a space formed by the foldable housings 210 and 220. For example, the display 230 may be seated in a recess (e.g., the recess 201 in FIG. 2A) formed by a pair of housing structures 210 and 220, and may be disposed to occupy substantially most of the front surface of the electronic device 200. Accordingly, the front surface of the electronic device 200 may include the display 230, and a partial area (e.g., a periphery area) of the first housing structure 210 and a partial area (e.g., a periphery area) of the second housing structure 220, which are adjacent to the display 230. In an embodiment, the rear surface of the electronic device 200 may include a first rear cover 240, a partial area (e.g., a periphery area) of the first housing structure 210 adjacent to the first rear cover 240, the second rear cover 250, and a partial area (e.g., a periphery area) of the second housing structure 220 adjacent to the second rear cover 250.

In an embodiment, the display 230 may indicate a display in which at least a partial area may be transformed into a flat surface or a curved surface. In an embodiment, the display 230 may include a folding area 231c, a first area 231a disposed at one side of the folding area 231c (e.g., in the right area of the folding area 231c), and a second area 231b disposed at the other side thereof (e.g., in the left area of the folding area 231c). For example, the first area 231a may be disposed on the first surface 211 of the first housing structure 210, and the second area 231b may be disposed on the third surface 221 of the second housing structure 220. In an embodiment, division of the display 230 is provided by way of example, and the display 230 may be divided into a plurality of (e.g., four or more or two) areas depending on a structure or function thereof. For example, the area of the display 230 may be divided based on the folding area 231c or the folding axis (e.g., axis A) extending parallel to the y-axis in the embodiment shown in FIG. 2A. Alternatively or additionally, the area of the display 230 may be divided based on another folding area (e.g., a folding area parallel to the x-axis) or another folding axis (e.g., a folding axis parallel to the x-axis). The above-described division of the area of the display is only a physical division by the pair of housing structures 210 and 220 and the hinge structure (e.g., the hinge structure 264 in FIG. 3), and the display 230 may display substantially one full screen through the pair of housing structures 210 and 220 and the hinge structure (e.g., the hinge structure 264 in FIG. 3). In an embodiment, the first area 231a and the second area 231b may have an overall symmetrical shape with respect to the folding area 231c. However, unlike the second area 231b, the first area 231a may include a notch area (e.g., the notch area 233 in FIG. 3) that is cut due to the presence of the sensor area 231d, but may have a symmetrical shape to the second area 231b in other areas. For example, the first area 231a and the second area 231b may include portions having shapes symmetric to each other and portions having shapes asymmetric to each other.

Referring to FIG. 2B, the hinge cover 265 may be configured to be disposed between the first housing structure 210 and the second housing structure 220 to cover internal components (e.g., the hinge structure 264 in FIG. 3). In an embodiment, the hinge cover 265 may be covered by a portion of the first housing structure 210 and the second housing structure 220 or exposed to the outside depending on the operation state (flat state or folded state) of the electronic device 200.

For example, as shown in FIG. 2A, when the electronic device 200 is in the unfolded state, the hinge cover 265 may be covered by the first housing structure 210 and the second housing structure 220 so as not to be exposed. For example, as shown in FIG. 2B, when the electronic device 200 is in the folded state (e.g., in a completely folded state), the hinge cover 265 may be exposed to the outside between the first housing structure 210 and the second housing structure 220. For example, in the case of the intermediate state in which the first housing structure 210 and the second housing structure 220 are folded at a certain angle, the hinge cover 265 may be partially exposed to the outside of the electronic device 200 between the first housing structure 210 and the second housing structure 220. In this case, the exposed area may be smaller than in the completely folded state. In an embodiment, the hinge cover 265 may include a curved surface.

Hereinafter, the operation of the first housing structure 210 and the second housing structure 220 depending on the operation state (e.g., the unfolded state (flat state) and the folded state) of the electronic device 200, and respective areas of the display 230 will be described.

In an embodiment, when the electronic device 200 is in the unfolded state (flat state) (e.g., the state in FIG. 2A), the first housing structure 210 and the second housing structure 220 may form an angle of 180 degrees, and the first area 231a and the second area 231b of the display may be disposed to face in the same direction. Alternatively or additionally, the folding area 231c may form the same plane as the first area 231a and the second area 231b.

In an embodiment, when the electronic device 200 is in the folded state (e.g., the state in FIG. 2B), the first housing structure 210 and the second housing structure 220 may be disposed to face each other. The first area 231a and the second area 231b of the display 230 may form a narrow angle (e.g., between 0 degrees and 10 degrees) therebetween and, in some cases, face each other. At least a portion of the folding area 231c may be formed of a curved surface having a predetermined curvature.

In an embodiment, when the electronic device 200 is in the intermediate state, the first housing structure 210 and the second housing structure 220 may be disposed at a certain angle therebetween. The first area 231a and the second area 231b of the display 230 may form an angle greater than in the folded state and smaller than in the unfolded state. At least a portion of the folding area 231c may be formed of a curved surface having a predetermined curvature, and the curvature may be smaller than that in the folded state.

The embodiment described above relates to an in-folding type in which the first surface 211 of the first housing structure 210 and the third surface 221 of the second housing structure 220 are disposed to face each other when the electronic device 200 is in the folded state. However, various embodiments of the disclosure to be described below may be applied to an out-folding type in which the second surface 212 of the first housing structure 210 and the fourth surface 222 of the second housing structure 220 are disposed to face each other when the electronic device 300 is in the folded state.

Figure 3A:
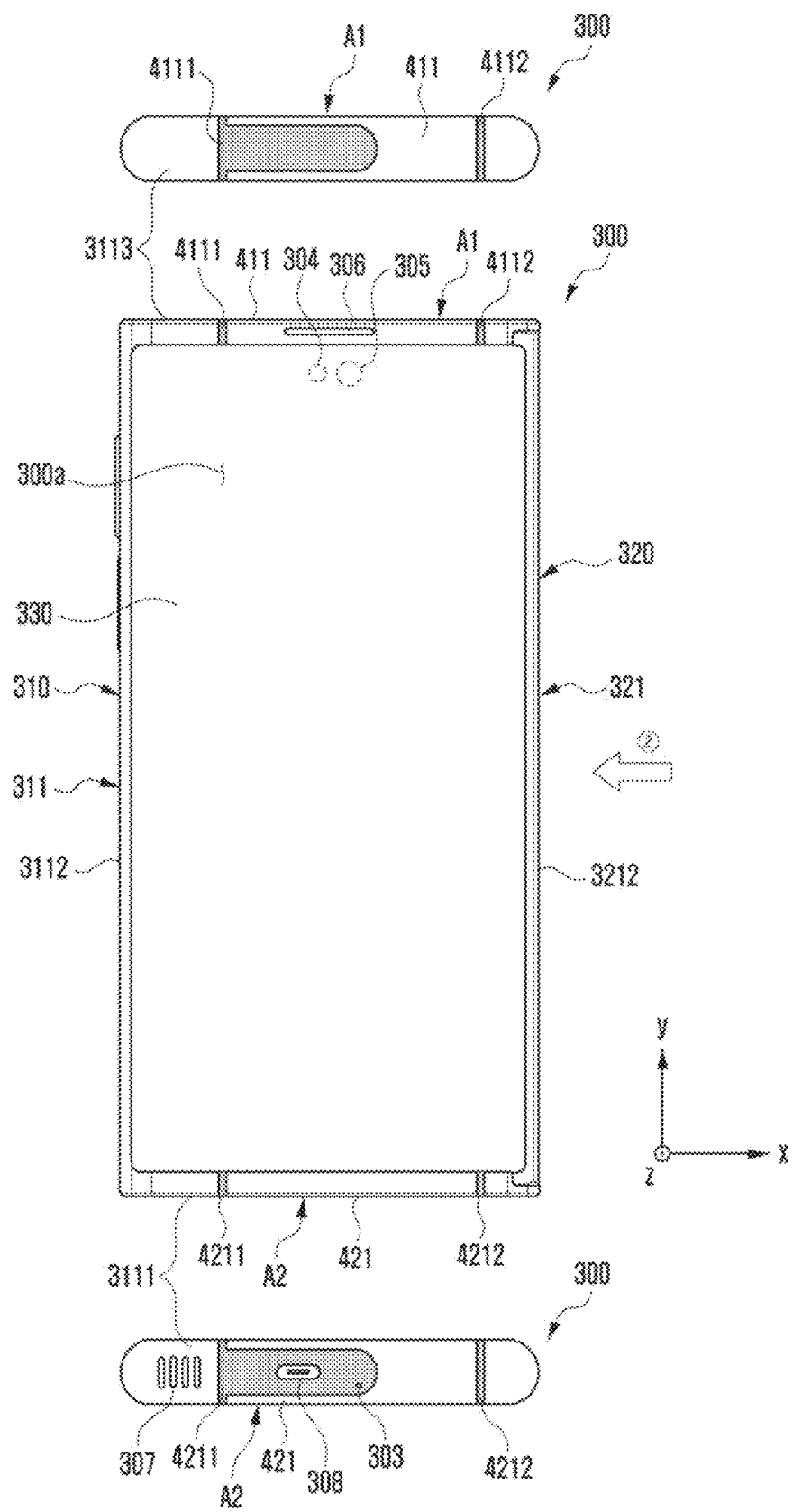
FIG. 3A is a diagram illustrating a front surface of an electronic device in a slide-in state of an electronic device including a rollable housing according to various embodiments of the disclosure.
Figure 3B:
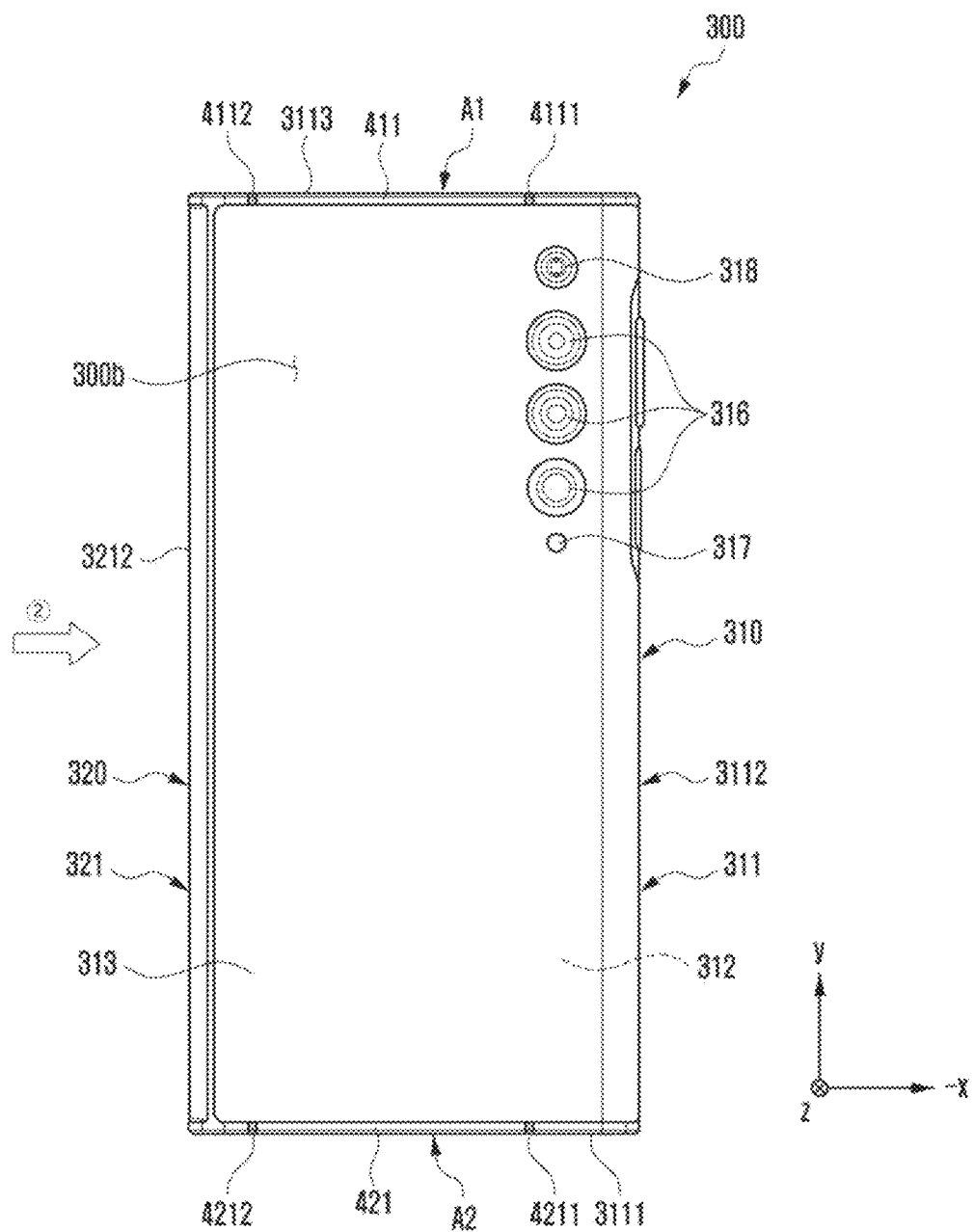
FIG. 3B is a diagram illustrating a rear surface of an electronic device in a slide-in state of an electronic device including a rollable housing according to various embodiments of the disclosure.
Figure 3C:
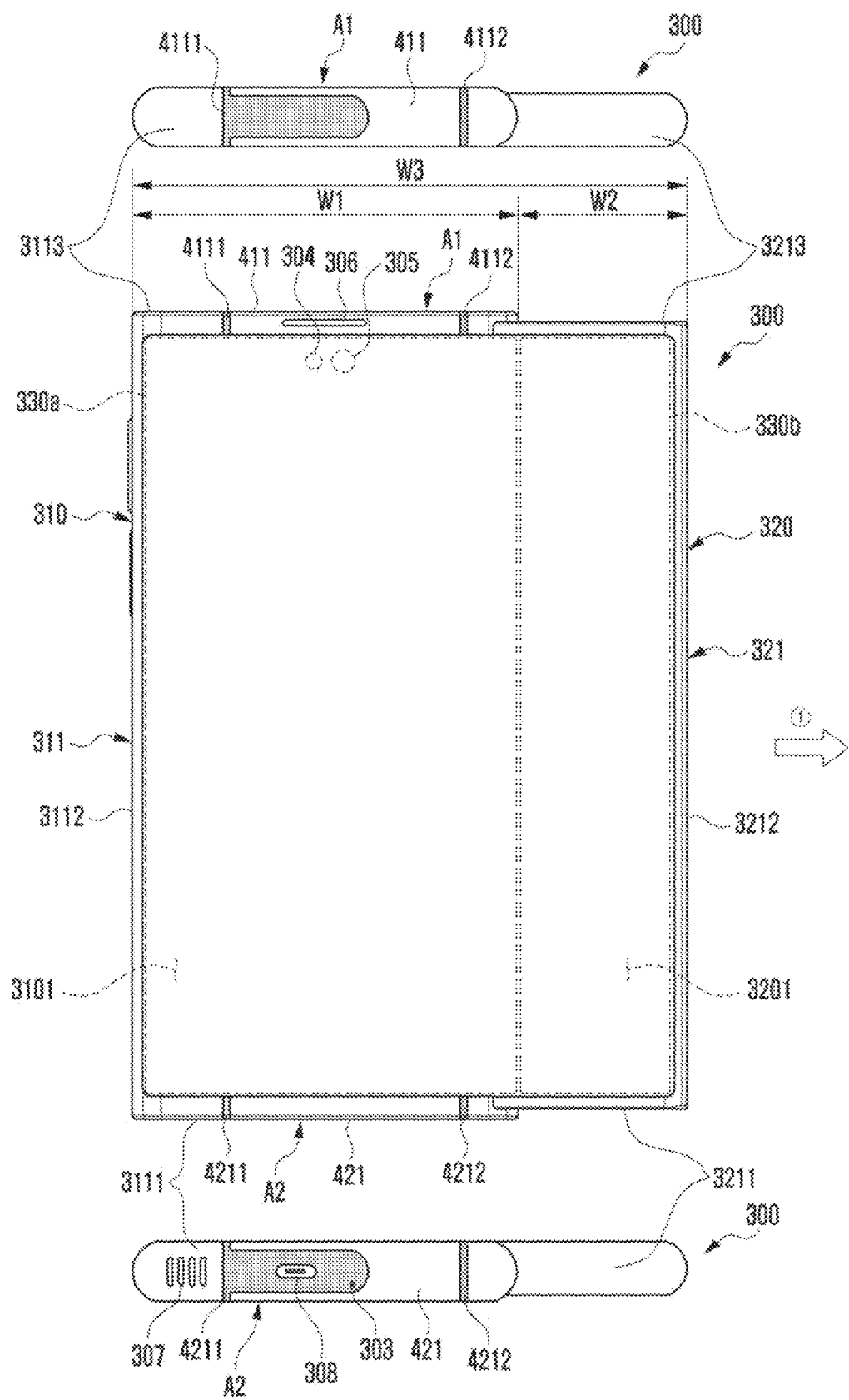
FIG. 3C is a diagram illustrating a front surface of an electronic device in a slide-out state of an electronic device including a rollable housing according to various embodiments of the disclosure.
Figure 3D:
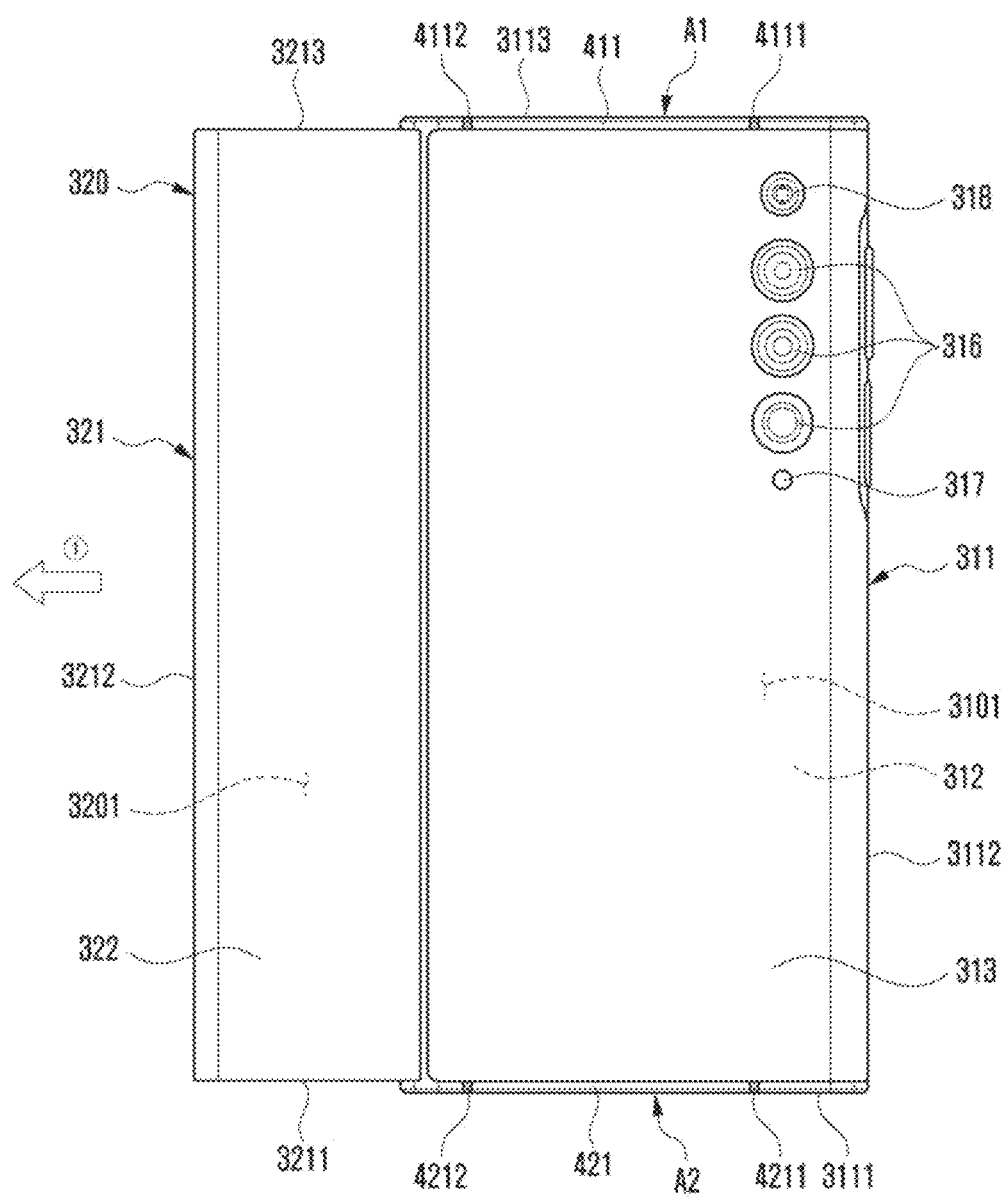
FIG. 3D is a diagram illustrating a rear surface of an electronic device in a slide-out state of an electronic device including a rollable housing according to various embodiments of the disclosure.

FIGS. 3A and 3B are diagrams illustrating a front surface and a rear surface, respectively, of an electronic device in a slide-in state according to various embodiments of the disclosure. FIGS. 3C and 3D are diagrams illustrating a front surface and a rear surface, respectively, of an electronic device in a slide-out state according to various embodiments of the disclosure.

An electronic device 300 in FIGS. 3A to 3D may be at least partially similar to the electronic device 101 in FIG. 1 and the electronic device 200 of FIGS. 2A and 2B or may further include other embodiments of the electronic device.

Referring to FIGS. 3A to 3D, the electronic device 300 may include a first housing 310 (e.g., a first housing structure or a base housing), a second housing 320 (e.g., a second housing structure or a slide housing) coupled to move in a specified direction (e.g., the x-axis direction) and within a specified distance from the first housing 310, and a flexible display 330 (e.g., an expandable display or a stretchable display) disposed to be supported through at least a portion of the first housing 210 and the second housing 320. According to an embodiment, at least a portion of the second housing 320 may be received inside a first space 3101 of the first housing 310, switching to a slide-in state. According to an embodiment, the electronic device 300 may include a bendable member (or a bendable support member) (e.g., an articulated hinge module or a multi-bar assembly) that at least partially forms the same plane as at least a portion of the first housing 310 in the slide-out state and is at least partially received inside a second space 3201 of the second housing 320 in the slide-in state. According to an embodiment, at least a portion of the flexible display 330 may be received inside an inner space 3201 of the second housing 320 while being supported by the bendable member in the slide-in state, thereby being disposed to be invisible to the outside. According to an embodiment, at least a portion of the flexible display 330 may be disposed to be visible to the outside in the slide-out state while being supported by the bendable member forming at least partially the same plane as the first housing 310.

According to various embodiments, the electronic device 300 may include a front surface 300a (e.g., a first surface), a rear surface 300b (e.g., a second surface) facing in the opposite direction of the front surface 300a, and a side surface (not shown) surrounding a space between the front surface 300a and the rear surface 300b. According to an embodiment, the electronic device 300 may include a first housing 310 including a first side member 311, and a second housing 320 including a second side member 321. According to an embodiment, the first side member 311 may include a first side surface 3111 having a first length along a first direction (e.g., the x-axis direction), a second side surface 3112 extending from the first side surface 3111 in a substantially perpendicular direction (e.g., the y-axis direction) to have a second length greater than the first length, and a third side surface 3113 extending substantially parallel to the first side surface 3111 from the second side surface 3112 and having the first length. According to an embodiment, the first side member 311 may be at least partially formed of a conductive material (e.g., metal). According to an embodiment, at least a portion of the first side member 311 may include a first support member 312 extending to at least a portion of the first space 3101 of the first housing 310.

According to various embodiments, the second side member 321 may include a fourth side surface 3211 at least partially corresponding to the first side surface 3111 and having a third length, a fifth side surface 3212 extending in a direction substantially parallel to the second side surface 3112 from the fourth side surface 3211 and having a fourth length greater than the third length, and a sixth side surface 3213 extending from the fifth side surface 3212 to correspond to the third side surface 3113 and having the third length. According to an embodiment, the second side member 321 may be at least partially formed of a conductive material (e.g., metal). According to an embodiment, at least a portion of the second side member 321 may include a second support member 322 extending to at least a portion of the second space 3201 of the second housing 320. According to an embodiment, the first side surface 3111 and the fourth side surface 3211, and the third side surface 3113 and the sixth side surface 3213 may be slidably coupled to each other. According to an embodiment, in the slide-in state, the fourth side surface 3211 may be disposed to overlap the first side surface 3111 so as to be substantially invisible to the outside. According to an embodiment, in the slide-in state, the sixth side surface 3213 may be disposed to overlap the third side surface 3113 so as to be substantially invisible to the outside. In some embodiments, at least a portion of the fourth side surface 3211 and the sixth side surface 3213 may be disposed to be at least partially visible to the outside in the slide-in state. According to an embodiment, in the slide-in state, the second support member 322 may be disposed to overlap the first support member 312 so as to be substantially invisible to the outside. In some embodiments, a portion of the second support member 322, in the slide-in state, may be disposed to overlap the first support member 312 so as to be invisible to the outside, and the remaining portions of the second support member 322 may be disposed to be visible to the outside. According to an embodiment, the electronic device may include a rear cover 313 disposed in at least a portion of the first housing 310 on the rear surface 300b. According to an embodiment, the rear cover 313 may be disposed through at least a portion of the first support member 312. In some embodiments, the rear cover 313 may be integrally formed with the first side member 311. According to an embodiment, the rear cover 313 may be formed of polymer, coated or tinted glass, ceramic, metal (e.g., aluminum, stainless steel (STS), or magnesium), or a combination of at least two of the above materials. In some embodiments, the rear cover 313 may extend to at least a portion of the first side member 311. In some embodiments, at least a portion of the first support member 312 may be replaced with the rear cover 313. In some embodiments, the electronic device 300, in the second housing 320, may be disposed in at least a portion of the second support member 322 or may include another rear cover (e.g., a second rear cover) that is replaced with at least a portion of the second support member 322.

According to various embodiments, the electronic device 300 may include a flexible display 330 disposed to be supported by at least a portion of the first housing 310 and the second housing 320. According to an embodiment, the flexible display 330 may include a first portion 330a (e.g., a flat portion) that is visible to the outside and a second portion 330b (e.g., a bendable portion) extending from the first portion 330a and at least partially received inside the second space 3201 of the second housing 320 so as to be invisible to the outside in the slide-in state. According to an embodiment, the first portion 330a may be disposed to be supported by the first housing 310, and the second portion 330b may be disposed to be supported at least partially by the bendable member. According to an embodiment, the flexible display 330 may extend from the first portion 330a while being supported by the bendable member in the state in which the second housing 320 has slid out along a specified direction (the direction ①) to be disposed to form substantially the same plane as the first portion 330a and to be visible to the outside. According to an embodiment, the second portion 330b of the flexible display 330 may be received inside the second space 3201 of the second housing 320 in the state in which the second housing 320 has slid in along a specified direction (the direction ②) so as to be disposed to be invisible to the outside. Accordingly, the electronic device 300 may induce the flexible display 230 to change the display area thereof as the second housing 320 slides from the first housing 310 in a specified direction (e.g., the x-axis direction).

According to various embodiments, the first housing 310 and the second housing 320 may be operated in a sliding manner such that the overall width thereof is variable with respect to each other. According to an embodiment, the electronic device 300 may be configured to have a first width W1 between the second side surface 3112 and the fifth side surface 3212 in the slide-in state. According to an embodiment, the electronic device 300 may be configured to have a third width W3 greater than the first width W1 in the slide-out state through an operation in which at least a portion of the bendable member received inside the second space 3201 of the second housing 320 moves to have an additional second width W2. For example, the flexible display 330 may have a display area substantially corresponding to the first width W1 in the slide-in state and may have an expand display area substantially corresponding to the third width W3 in the slide-out state.

According to various embodiments, a slide-in/slide-out operation of the electronic device 300 may be performed automatically. For example, if the electronic device 300 detects a triggering operation for switching from the slide-in state to the slide-out state or from the slide-out state to the slide-in state in the state in which a driving module does not operate, the electronic device 300 may operate the driving module disposed inside the electronic device 300. According to an embodiment, the triggering operation may include an operation of detecting the movement distance to which the second housing moves by a push-pull section in a slide-in direction (e.g., the direction ②). For example, the electronic device 300 may operate or stop the driving module through a driving motor control module that is operatively connected to a processor (e.g., the processor 120 in FIG. 1) and controls a driving motor of the driving module (e.g., servo control).

According to various embodiments, the electronic device 300 may include a sensor (e.g., the sensor module 192 in FIG. 1) for sensing a slide-in/slide-out operation. The sensor 192 may detect a slide-in/slide-out operation of the electronic device 300 and detect a length between the first housing 310 and the second housing 320. The length between the first housing 310 and/or the second housing 320 may indicate the degree to which the second housing structure 320 (or the first housing 310) slides in (or slides out). According to an embodiment, the sensor 192 may include at least one of a magnetic-force sensor (e.g., the Hall integrated circuit (IC)) and a capacitor sensor for measuring a change in a capacitor value of a touch screen panel included in the flexible display 330 in order to measure the length between the first housing 310 and/or the second housing 320. Alternatively or additionally, the sensor 192 may include operation information (e.g., torque) of a motor to perform slide-in and/or slide-out operation between the first housing 310 and/or the second housing 320, an optical sensor, and/or a strain gauge sensor that measures a resistance value that changes depending on the slide-in and/or slide-out operation of the first housing 310 and/or the second housing 320.

According to various embodiments, the electronic device 300 may include at least one of an input device (e.g., a microphone 303), a sound output device (e.g., a receiver for a call 306 or a speaker 307), sensor modules 304 and 317, a camera module (first camera module 305 or second camera module 316), a connector port 308, a key input device (not shown), or an indicator (not shown), which are disposed in the first space 3101 of the first housing 310. In another embodiment, the electronic device 300 may be configured to exclude at least one of the above-described elements or further include other elements. In another embodiment, at least one of the above-described elements may be disposed in the second space 3201 of the second housing 320.

According to various embodiments, the input device may include a microphone 303. In some embodiments, the input device (e.g., the microphone 303) may include a plurality of microphones disposed to detect the direction of sound. The sound output device may include, for example, a receiver 306 for a call and a speaker 307. According to an embodiment, the speaker 307 may face the outside through at least one speaker hole formed in the first housing 310 in the slide-out state. According to an embodiment, the connector port 308 may face the outside through a connector port hole formed in the first housing 310 in the slide-out state. In some embodiments, the receiver 306 for a call may include a speaker (e.g., a piezo speaker) that operates without a separate speaker hole.

According to various embodiments, the sensor modules 304 and 317 may produce an electrical signal and/or data value corresponding to an internal operation state of the electronic device 300 or an external environmental state. The sensor modules 304 and 317 may include, for example, a first sensor module 304 (e.g., a proximity sensor, an illuminance sensor) disposed on the front surface 300a of the electronic device 300 and/or a second sensor module 317 (e.g., a heart rate monitoring (HRM) sensor) disposed on the rear surface 300b. According to an embodiment, the first sensor module 304 may be disposed under the flexible display 330 on the front surface 300a of the electronic device 300. According to an embodiment, the first sensor module 304 and/or the second sensor module 317 may include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera module may include a first camera module 305 disposed on the front surface 300a of the electronic device 300 and a second camera module 316 disposed on the rear surface 300b of the electronic device 300. According to an embodiment, the electronic device 300 may include a flash 318 positioned near the second camera module 316. According to an embodiment, the camera modules 305 and 316 may include one or more lenses, an image sensor, and/or an image signal processor. According to an embodiment, the first camera module 305 may be configured to be disposed under the flexible display 330 and photograph a subject through a portion of the active area of the flexible display 330. According to an embodiment, the flash 318 may include, for example, a light-emitting diode or a xenon lamp.

According to various embodiments, the first camera module 305 among the camera modules and some sensor modules 304 among the sensor modules 304 and 317 may be disposed to detect an external environment through the flexible display 330. For example, the first camera module 305 or some sensor modules 304 may be disposed to communicate with the external environment through a transparent area or perforated opening formed in the flexible display 330 in the first space 3101 of the first housing 310. According to an embodiment, the area of the flexible display 330 facing the first camera module 305, as a portion of the area displaying content, may be formed as a transmission area having a specified transmittance. According to an embodiment, the transmission area may be formed to have a transmittance in the range of about 5% to about 20%, for example. The transmission area may include an area overlapping an effective area (e.g., an angle of view) of the first camera module 305 through which light incident on an image sensor to produce an image passes. For example, the transmission area of the flexible display 330 may include an area having a lower pixel density and/or wire density than that in the surrounding area. For example, the transmission area may replace the aforementioned opening. For example, some camera modules 305 may include an under-display camera (UDC). In some embodiments, some sensor modules 304 may be disposed in the internal space of the electronic device 300 to perform their functions without being visually exposed through the flexible display 330.

According to various embodiments, the electronic device 300 may include one or more antennas (e.g., first antenna A1 and second antenna A2) electrically connected to a wireless communication circuit (e.g., the wireless communication module 192 in FIG. 1) disposed in the first space 3101 of the first housing 310. According to an embodiment, the one or more antennas A1 and A2 may include the first antenna A1 disposed in the upper area of the electronic device 300 and the second antenna A2 disposed in the lower area of the electronic device 300. In some embodiments, the electronic device 300 may further include at least one antenna disposed on the second side surface 3112 of the first housing 310 and/or the fifth side surface 3212 of the second housing 320. According to an embodiment, the first antenna A1 may include a first conductive part 411 segmented by one or more non-conductive parts 4111 and 4112 on the third side surface 3113 of the first side member 311. According to an embodiment, the first conductive part 411 may be disposed to be segmented by a first non-conductive part 4111 and a second non-conductive part 4112 spaced apart by a predetermined interval and may be electrically connected to a wireless communication circuit (e.g., the wireless communication module 192 in FIG. 1). According to an embodiment, the second antenna A2 may include a second conductive part 412 segmented by one or more non-conductive parts 4211 and 4212 on the first side surface 3111 of the first side member 311. According to an embodiment, the second conductive part 412 may be disposed to be segmented by a third non-conductive part 4211 and a fourth non-conductive part 4212 spaced apart by a predetermined interval and may be electrically connected to a wireless communication circuit (e.g., the wireless communication module 192 in FIG. 1). According to an embodiment, the wireless communication circuit (e.g., the wireless communication module 192 in FIG. 1) may be configured to transmit and/or receive wireless signals in a specified frequency band (e.g., about 800 MHz to 6000 MHz) (e.g., a legacy band) through the first conductive part 411 and/or the second conductive part 412. In some embodiments, the electronic device 200 may further include at least one antenna module (e.g., an antenna module for short-range wireless communication, or a 5G antenna module or antenna structure) disposed in the internal space (e.g., a first space 2101 or a second space 2201) to transmit and receive wireless signals in a frequency band of about 3 GHz to 100 GHz through another wireless communication circuit (e.g., the wireless communication module 192 in FIG. 1).

The electronic device 300 according to exemplary embodiments of the disclosure may include a driving module disposed in the internal space (e.g., a second space 3201) for a slide-in/slide-out operation. According to an embodiment, the electronic device 300 may use a push-pull operation as a triggering operation for driving the driving module. For example, if the electronic device 300 detects a triggering operation in which the second housing 320 is pushed by a push-pull section in a direction (e.g., the direction ②) in which the second housing 320 slides in the slide-in state while the driving module does not operate, the electronic device 300 may automatically slide out the second housing 320 through the drive module (push and pull-out operation) (e.g., slide-out operation). According to an embodiment, if the electronic device 300 detects a triggering operation in which the second housing 320 is pushed by a push-pull section in a direction (e.g., the direction ②) in which the second housing 320 slides in the slide-out state while the driving module does not operate, the electronic device 300 may cause the second housing 320 to automatically slide in through the drive module (push and pull-in operation) (e.g., slide-in operation). Accordingly, the electronic device 300 may provide an intuitive triggering means (switching means) for slide-in/slide-out operation to the user, thereby providing an intuitive and new experience and improving convenience for use.

Figure 4A:
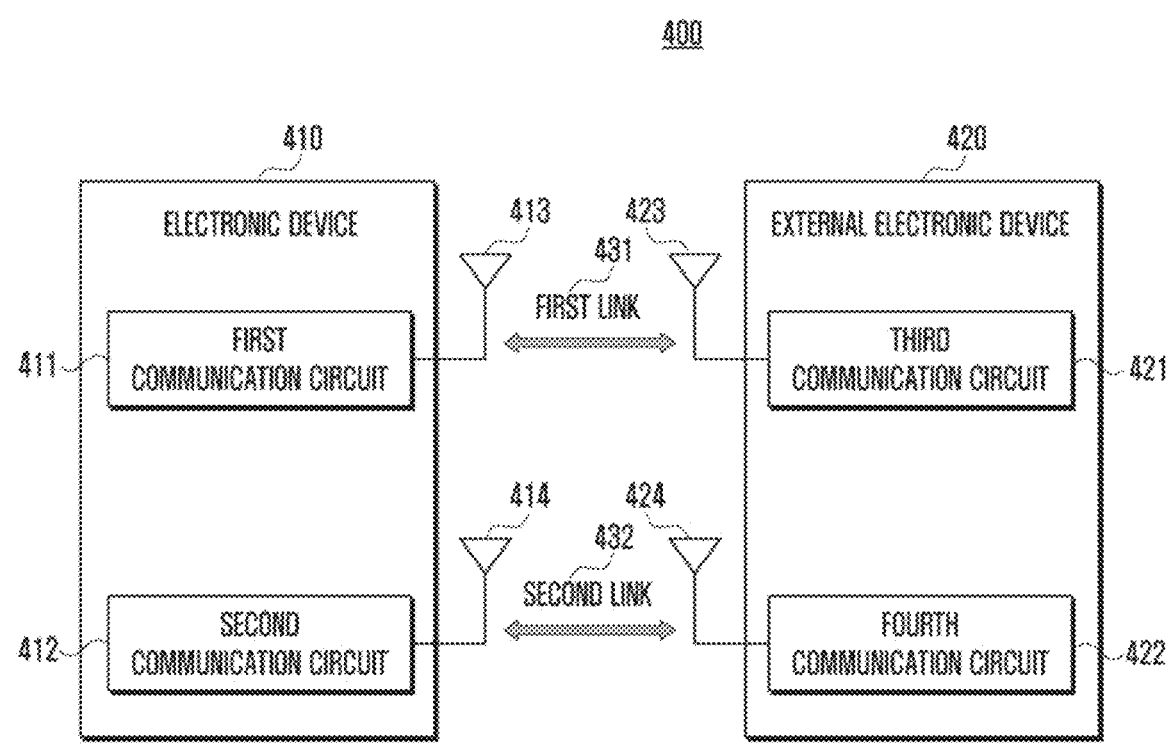
FIG. 4A is a diagram illustrating an embodiment in which an electronic device and an access point (AP) operate in a multi-link operation (MLO) according to various embodiments of the disclosure.

FIG. 4A is a diagram illustrating an embodiment in which an electronic device and an external electronic device (e.g., an access point (AP)) operate in a multi-link operation (MLO) according to various embodiments of the disclosure.

Referring to FIG. 4, a wireless local-area network (WLAN) system 400 may include an electronic device 410 and/or an external electronic device 420. According to an embodiment, the electronic device 410 may perform wireless communication with the external electronic device 420 through short-range wireless communication. Wireless communication may indicate various communication schemes that both the electronic device 410 and/or the external electronic device 420 can support. For example, the wireless communication may be Wi-Fi. The external electronic device 420 may serve as a base station that provides wireless communication to at least one electronic device 410 located within a communication radius of the WLAN system 400. For example, the external electronic device 420 may include an AP of IEEE 802.11. The electronic device 410 may include a station (STA) of IEEE 802.11.

According to various embodiments of the disclosure, the electronic device 410 and/or the external electronic device 420 may support a multi-link operation (MLO). The multi-link operation may be an operation mode for transmitting or receiving data through a plurality of links (e.g., a first link 431 and a second link 432). The multi-link operation may be an operation mode to be introduced in IEEE 802.11be, and may be an operation mode for transmitting or receiving data through a plurality of links based on a plurality of bands or channels.

According to various embodiments of the disclosure, the electronic device 410 may include a plurality of communication circuits (e.g., a first communication circuit 411 and/or a second communication circuit 412) to support the multi-link operation. The first communication circuit 411 may transmit data to the external electronic device 420 through the first link 431 or receive data transmitted by the external electronic device 420 through the first link 431. The first communication circuit 411 may output or receive a signal in a frequency band corresponding to the first link 431 through the first antenna 413. The second communication circuit 412 may transmit data to the external electronic device 420 through the second link 432 or receive data transmitted by the external electronic device 420 through the second link 432. The second communication circuit 412 may output or receive a signal in a frequency band corresponding to the second link 432 through the second antenna 414.

According to various embodiments of the disclosure, the external electronic device 420 may include a plurality of communication circuits (e.g., a third communication circuit 421 and/or a fourth communication circuit 422) to support the multi-link operation. The third communication circuit 421 may transmit data to the electronic device 410 through the first link 431 or receive data transmitted by the electronic device 410 through the first link 431. The third communication circuit 421 may output or receive a signal in a frequency band corresponding to the first link 431 through the third antenna 423. The fourth communication circuit 422 may transmit data to the electronic device 410 through the second link 432 or receive data transmitted by the electronic device 410 through the second link 432. The fourth communication circuit 422 may output or receive a signal in a frequency band corresponding to the second link 432 through the fourth antenna 424.

According to various embodiments of the disclosure, the frequency band of the first link 431 and the frequency band of the second link 433 may be different from each other. For example, the frequency band of the first link 431 may be 2.5 GHz, and the frequency band of the second link 432 may be 5 GHz or 6 GHz.

According to various embodiments of the disclosure, the first link 431 and the second link 432 may use an electronic device other than the electronic device 410. In order to prevent the electronic device 410 and another electronic device from simultaneously transmitting or receiving data through the same link, the electronic device 410 may support a carrier sense multiple-access-with-collision avoidance (CSMA/CA) method. The CSMA/CA method may be a method of transmitting data when a specific link is in an idle state. The electronic device 410 supporting CSMA/CA may identify whether or not another electronic device transmits data through a specific link and, if data transmission is detected, wait, instead of transmitting data through the specific link. The electronic device 410 supporting CSMA/CA, in response to identifying that another electronic device does not transmit data through the specific link, may transmit data in a specified manner (e.g., activate a timer and transmit data when the timer expires) through the specific link. Through the above method, the electronic device 410 may perform transmission and/or reception of data using a specific link without colliding with other electronic devices.

According to various embodiments of the disclosure, the first link 431 and/or the second link 432 supported by the multi-link operation may independently support CSMA/CA.

Figure 4B:
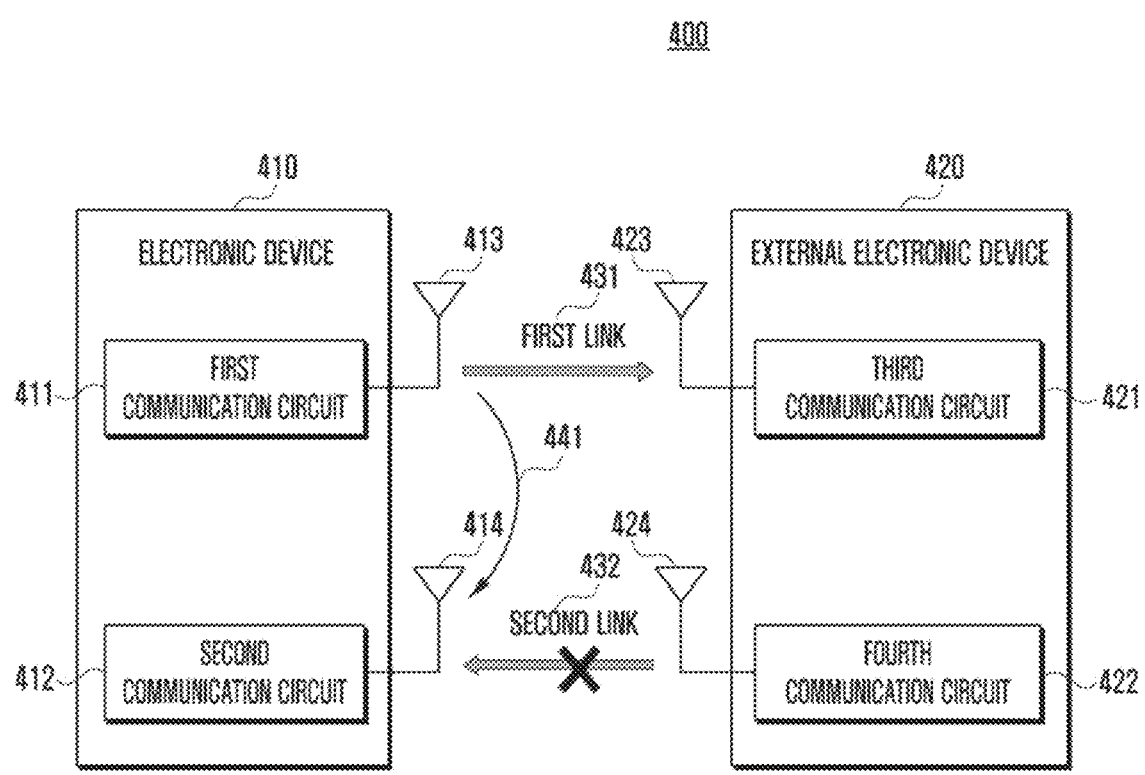
FIG. 4B is a diagram illustrating an embodiment in which an electronic device operates in a non-simultaneous transmission and reception (non-STR) mode according to various embodiments of the disclosure.

FIG. 4B is a diagram illustrating an embodiment in which an electronic device operates in a non-simultaneous transmission and reception (non-STR) mode according to various embodiments of the disclosure.

Referring to FIG. 4B, a WLAN system 400 may include an electronic device 410 and/or an external electronic device 420. According to an embodiment, the electronic device 410 may perform wireless communication with the external electronic device 420 through short-range wireless communication. Wireless communication may indicate various communication schemes that both the electronic device 410 and/or the external electronic device 420 are able to support. For example, the wireless communication may be Wi-Fi. The external electronic device 420 may serve as a base station that provides wireless communication to at least one electronic device 410 located within a communication radius of the WLAN system 400. For example, the external electronic device 420 may include an AP of IEEE 802.11. The electronic device 410 may include a STA of IEEE 802.11.

According to various embodiments of the disclosure, the electronic device 410 and/or the external electronic device 420 may support a multi-link operation (MLO). The multi-link operation may be an operation mode for transmitting or receiving data through a plurality of links (e.g., a first link 431 and a second link 432). The multi-link operation may be an operation mode to be introduced in IEEE 802.11be, and may be an operation mode for transmitting or receiving data through a plurality of links based on a plurality of bands or channels.

According to various embodiments of the disclosure, the electronic device 410 may include a plurality of communication circuits (e.g., a first communication circuit 411 and/or a second communication circuit 412) to support the multi-link operation. The first communication circuit 411 may transmit data to the external electronic device 420 through the first link 431 or receive data transmitted by the external electronic device 420 through the first link 431. The first communication circuit 411 may output or receive a signal in a frequency band corresponding to the first link 431 through the first antenna 413. The second communication circuit 412 may transmit data to the external electronic device 420 through the second link 432 or receive data transmitted by the external electronic device 420 through the second link 432. The second communication circuit 412 may output or receive a signal in a frequency band corresponding to the second link 432 through the second antenna 414.

According to various embodiments of the disclosure, the external electronic device 420 may include a plurality of communication circuits (e.g., a third communication circuit 421 and/or a fourth communication circuit 422) to support the multi-link operation. The third communication circuit 421 may transmit data to the electronic device 410 through the first link 431 or receive data transmitted by the electronic device 410 through the first link 431. The third communication circuit 421 may output or receive a signal in a frequency band corresponding to the first link 431 through the third antenna 423. The fourth communication circuit 422 may transmit data to the electronic device 410 through the second link 432 or receive data transmitted by the electronic device 410 through the second link 432. The fourth communication circuit 422 may output or receive a signal in a frequency band corresponding to the second link 432 through the fourth antenna 424.

According to various embodiments of the disclosure, the frequency band of the first link 431 and the frequency band of the second link 433 may be different from each other. For example, the frequency band of the first link 431 may be 2.5 GHz, and the frequency band of the second link 432 may be 5 GHz.

According to various embodiments of the disclosure, the electronic device 410 may fail to secure a sufficient space 441 between the first antenna 413 and the second antenna 414 due to implementation reasons. According to an embodiment, in the case where the space 441 between the first antenna 413 and the second antenna 414 is not sufficiently secured, the signal output from the first antenna 413 and the signal received through second antenna 414 may interfere with each other. For example, the second antenna 414 may receive a signal in which the signal received through the second link 432 and a portion of the signal output from the first antenna 413 are combined, so the quality of a signal received through the second link 432 may be degraded.

According to various embodiments of the disclosure, in order to prevent a situation in which the signal output from the first antenna 413 and the signal output from the second antenna 414 interfere with each other, the electronic device 410 may support a non-simultaneous transmission and reception (STR) mode. The non-STR mode may indicate a mode in which the electronic device 410 does not receive data through the second link 432 when transmitting data to the external electronic device 420 through the first link 431. The non-STR mode may support an operation of receiving data through the second link 432 while receiving data through the first link 431 and/or an operation of transmitting data through the second link 432 while transmitting data through the first link 431.

According to various embodiments of the disclosure, the electronic device 410 operating in the non-STR mode may not receive data through the second link 432 in the case of transmitting data to the external electronic device 420 through the first link 431. Accordingly, the electronic device 410 operating in the non-STR mode may have a lower data transmission and/or reception rate than operating in the STR mode.

Figure 4C:
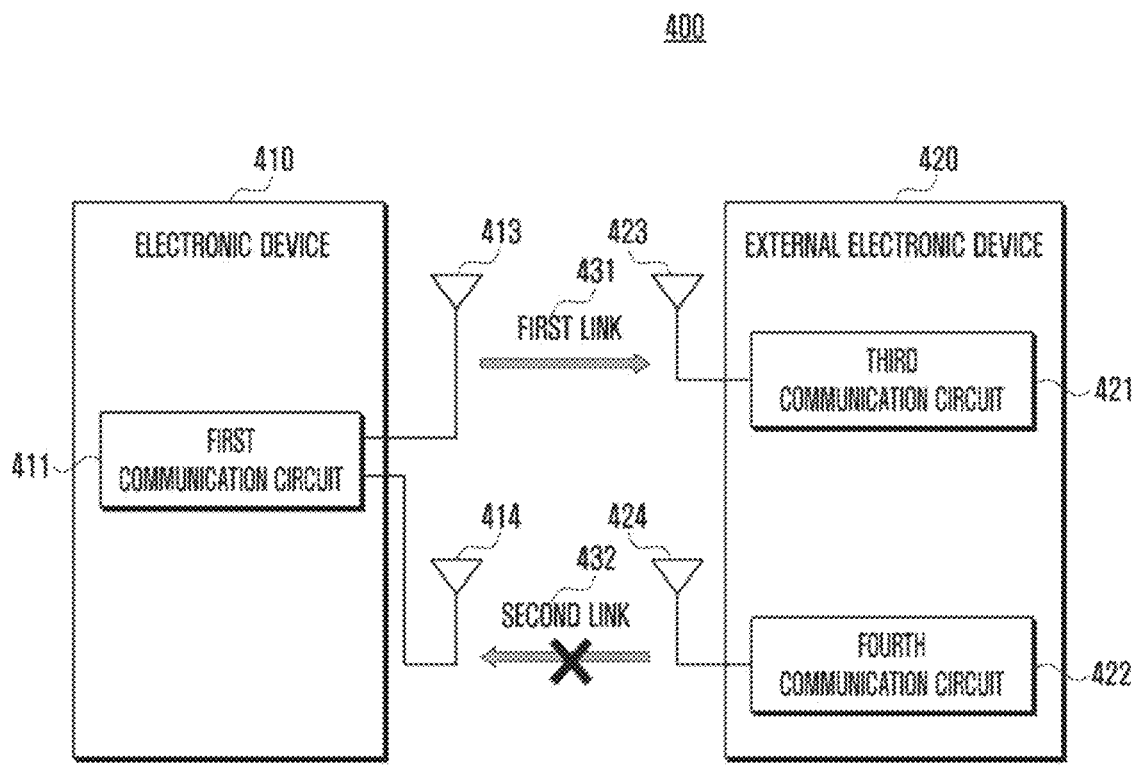
FIG. 4C is a diagram illustrating an embodiment in which an electronic device operates in an enhanced multi-link single-radio (EMLSR) mode according to various embodiments of the disclosure.

FIG. 4C is a diagram illustrating an embodiment in which an electronic device operates in an enhanced multi-link single-radio (EMLSR) mode according to various embodiments of the disclosure.

Referring to FIG. 4C, a WLAN system 400 may include an electronic device 410 and/or an external electronic device 420. According to an embodiment, the electronic device 410 may perform wireless communication with the external electronic device 420 through short-range wireless communication. Wireless communication may indicate various communication schemes that both the electronic device 410 and/or the external electronic device 420 are able to support. For example, the wireless communication may be Wi-Fi. The external electronic device 420 may serve as a base station that provides wireless communication to at least one electronic device 410 located within a communication radius of the WLAN system 400. For example, the external electronic device 420 may include an AP of IEEE 802.11. The electronic device 410 may include a STA of IEEE 802.11.

According to various embodiments of the disclosure, the electronic device 410 and/or the external electronic device 420 may support a multi-link operation (MLO). The multi-link operation may be an operation mode for transmitting or receiving data through a plurality of links (e.g., a first link 431 and a second link 432). The multi-link operation may be an operation mode to be introduced in IEEE 802.11be, and may be an operation mode for transmitting or receiving data through a plurality of links based on a plurality of bands or channels.

According to various embodiments of the disclosure, the electronic device 410 may include a first communication circuit 411 to support the multi-link operation. The first communication circuit 411 may transmit data to the external electronic device 420 through the first link 431 or receive data transmitted by the external electronic device 420 through the first link 431. The first communication circuit 411 may transmit data to the external electronic device 420 through the second link 432 or receive data transmitted by the external electronic device 420 through the second link 432. The first communication circuit 411 may output or receive a signal in a frequency band corresponding to the first link 431 through the first antenna 413, and output or receive a signal in a frequency band corresponding to the second link 432 through the second antenna 414.

According to various embodiments of the disclosure, the external electronic device 420 may include a plurality of communication circuits (e.g., a third communication circuit 421 and/or a fourth communication circuit 422) to support the multi-link operation. The third communication circuit 421 may transmit data to the electronic device 410 through the first link 431 or receive data transmitted by the electronic device 410 through the first link 431. The third communication circuit 421 may output or receive a signal in a frequency band corresponding to the first link 431 through the third antenna 423. The fourth communication circuit 422 may transmit data to the electronic device 410 through the second link 432 or receive data transmitted by the electronic device 410 through the second link 432. The fourth communication circuit 422 may output or receive a signal in a frequency band corresponding to the second link 432 through the fourth antenna 424.

According to various embodiments of the disclosure, the frequency band of the first link 431 and the frequency band of the second link 433 may be different from each other. For example, the frequency band of the first link 431 may be 2.5 GHz, and the frequency band of the second link 432 may be 5 GHz.

According to various embodiments of the disclosure, the electronic device 410 may support a multi-link operation using a plurality of links using one communication circuit (e.g., the first communication circuit 411) for implementation reasons. In this case, the electronic device 410 may perform an enhanced multi-link single-radio (EMLSR) mode in which relatively small data (e.g., control data, request-to-send (RTS) frames, clear-to-send (CTS) frames, or acknowledgement (ACK) messages) is transmitted using a plurality of links (e.g., the first link 431 and the second link 432) but relatively large data is transmitted through one link (e.g., the first link 431). The EMLSR mode may indicate a mode in which relatively small data is transmitted/received using a plurality of links and in which relatively large data is transmitted/received using a single link. The electronic device 410 operating in the EMLSR mode may not receive data through the second link 432 in the case of transmitting relatively large data to the external electronic device 420 through the first link 431. Accordingly, the electronic device 410 operating in the EMLSR mode may have a lower data transmission and/or reception rate that operating in the STR mode.

According to various embodiments of the disclosure, the electronic device 410 may be implemented in the form of a foldable housing in which a first housing structure (e.g., the first housing structure 210 in FIG. 2A) and a second housing structure (e.g., the second housing structure 220 in FIG. 2A) are foldable (or rotatable) through a hinge structure. The first antenna 413 may be implemented inside the first housing structure 210, and the second antenna 414 may be implemented inside the second housing structure 220. When the first housing structure 210 and the second housing structure 220 are folded or unfolded, the distance (or isolation) between the first antenna 413 and the second antenna 414 may vary. For example, the distance between the first antenna 413 and the second antenna 414 may decrease when the first housing structure 210 and the second housing structure 220 are folded. If the first housing structure 210 and the second housing structure 220 are folded in the state in which the electronic device 410 operates in the STR mode, the STR mode of the electronic device 410 may not be effectively operated as the distance between the first antenna 413 and the second antenna 414 is reduced.

According to various embodiments of the disclosure, the electronic device 410 may be implemented in the form of a rollable housing (or a slidable housing) in which a first housing structure (e.g., the first housing 310 in FIG. 3A) and a second housing structure (e.g., the second housing 320 in FIG. 3A) are movable in a specified direction and within a specified distance. The first antenna 413 may be implemented inside the first housing structure 310, and the second antenna 414 may be implemented inside the second housing structure 320. When the first housing structure 310 and the second housing structure 320 are in a slide-in or slide-out state, the distance (or isolation) between the first antenna 413 and the second antenna 414 may vary. For example, the distance between the first antenna 413 and the second antenna 414 may decrease when the first housing structure 310 and the second housing structure 320 are in the slide-in state. If the distance between the first housing structure 310 and the second housing structure 320 is reduced in the state in which the electronic device 410 operates in the STR mode, the STR mode of the electronic device 410 may not be effectively operated as the distance between the first antenna 413 and the second antenna 414 is reduced.

Hereinafter, a specific embodiment in which the electronic device 410 is able to effectively perform short-range wireless communication according to change of the first housing structure 210 or 310 and the second housing structure 220 or 320 will be described.

Figure 5:
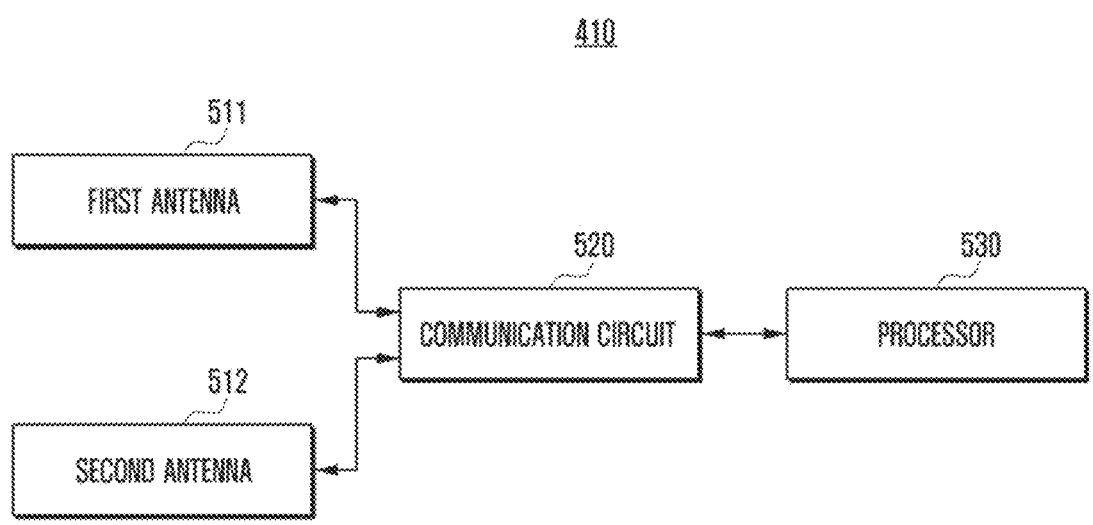
FIG. 5 is a block diagram of an electronic device according to various embodiments of the disclosure.

FIG. 5 may be a block diagram of an electronic device according to various embodiments of the disclosure.

An electronic device (e.g., the electronic device 410 in FIG. 4A) may include a first antenna 511 (e.g., the first antenna 411 in FIG. 4A), a second antenna 512 (e.g., the second antenna 412 in FIG. 4A), a communication circuit (e.g., the first communication circuit 411 or the second communication circuit 412 in FIG. 4B) 520 and/or a processor (e.g., the processor 120 in FIG. 1) 530.

The first antenna 511 may receive a signal transmitted by an external electronic device (e.g., the external electronic device 420 in FIG. 4A) or transmit a signal to the external electronic device 420. In the case where the electronic device 410 supports MLO, a signal in a frequency band corresponding to a first link (e.g., the first link 431 in FIG. 4A) may be transmitted or received, and a signal in a frequency band corresponding to a second link (e.g., the second link 432 in FIG. 4a) may be transmitted or received. The first antenna 511 may be implemented in the form of an array of a plurality of antennas.

The second antenna 512 may receive a signal transmitted by the external electronic device 420 or transmit a signal to the external electronic device 420. In the case where the electronic device 410 supports MLO, a signal in a frequency band corresponding to the first link 431 may be transmitted or received, and a signal in a frequency band corresponding to the second link 432 may be transmitted or received. The second antenna 512 may be implemented in the form of an array of a plurality of antennas.

The communication circuit 520 may transmit data to the external electronic device 420 through the first link 431 or receive data transmitted by the external electronic device 420 through the first link 431. The communication circuit 520 may transmit data to the external electronic device 420 through the second link 432 or receive data transmitted by the external electronic device 420 through the second link 432. The communication circuit 520 may output or receive a signal in a frequency band corresponding to the first link 431 through the first antenna 511 and/or the second antenna 512, and output or receive a signal in a frequency band corresponding to the second link 432 through the first antenna 511 and/or the second antenna 512.

Although one communication circuit 520 is illustrated in FIG. 5, the electronic device 410 may be implemented to include a plurality of communication circuits such as the first communication circuits 411 and/or the second communication circuits 412 as shown in FIG. 4A and/or FIG. 4B.

The processor 530 may be operatively connected to the communication circuit 520 to control the operation of the communication circuit 520.

The processor 530 may receive data transmitted by an application processor (e.g., the processor 120 in FIG. 1) and produce a packet for transmitting the received data to the external electronic device 420. The processor 530 may refer to a communication processor included in a communication module (e.g., the wireless communication module 192 in FIG. 1). According to an embodiment, the processor 530 may perform channel coding based on data transmitted by the application processor (e.g., the application processor 120 in FIG. 1) to produce a packet, identify whether or not there is an error in at least a portion of the data transmitted by the external electronic device 420, or perform an error recovery operation (e.g., hybrid auto repeat request (HARQ)) if there is an error.

The processor 530 may perform channel coding on the data as part of an operation of producing a packet, based on the data transmitted by the application processor 120. Channel coding may be performed by the processor 530 to increase a success rate of data transmission. The processor 530 may produce encoded data through a variety of channel coding (e.g., turbo coding, polar coding, or low-density parity check code (LDPC)) on data. When performing channel coding, the processor 530 may determine (or change) a data rate and/or modulation level (hereinafter, referred to as a modulation-and-coding scheme (MCS) level) of a packet. The processor 530 may produce mapping data in which a data rate and FER (or expected data throughput) are mapped through a frame error rate (FER) sampling method and store the same in a memory (e.g., the memory 130 in FIG. 1). The processor 530 may select a data rate corresponding to a value having the highest expected data throughput with reference to the mapping data stored in the memory (e.g., the memory 130 in FIG. 1) and perform channel coding on the data, based on the selected data rate, thereby producing a packet to be transmitted to the external electronic device 420.

The electronic device 410 may realize a high data transmission and/or reception rate when transmitting data having a high MCS level and realize a lower data transmission rate and/or reception rate when transmitting or receiving data having a lower MCS level. However, in order to transmit or receive data having a high MCS level, a distance between the first antenna 511 and the second antenna 512 must be a specified value or more, thereby obtaining high performance, and if the distance between the first antenna 511 and the second antenna 512 is not a specified value or more, high performance may not be obtained.

The processor 530 may negotiate with the external electronic device 420 for data transmission and/or reception through short-range wireless communication. The processor 530 may control the communication circuit 520 to transmit or receive data through an operation mode (STR mode or NSTR mode) determined by the negotiation with the external electronic device 420.

The simultaneous transmission-and-reception (STR) mode may indicate a mode in which the electronic device 410 may simultaneously transmit or receive data to or from the external electronic device 420 through the first link 431 and/or the second link 432. The electronic device 410 supporting the STR mode may transmit and/or receive data through the second link 432 while transmitting data through the first link 431. The STR mode may exhibit high performance when the distance between the first antenna 511 and the second antenna 512 is a specified value or more and may not exhibit high performance if the distance between the first antenna 511 and the second antenna 512 is not a specified value or more.

The non-STR mode may indicate a mode in which the electronic device 410 does not receive data the second link 432 when transmitting data to the external electronic device 420 through the first link 431. The electronic device 410 supporting the non-STR mode may support an operation of receiving data through the second link 432 while receiving data through the first link 431 and/or an operation of transmitting data through the second link 432 while transmitting data through the first link 431

According to various embodiments of the disclosure, the electronic device 410 may be implemented in the form of a foldable housing in which a first housing structure (e.g., the first housing structure 210 in FIG. 2A) and a second housing structure (e.g., the second housing structure 220 in FIG. 2A) are foldable (or rotatable) through a hinge structure. The first antenna 511 may be implemented inside the first housing structure 210, and the second antenna 512 may be implemented inside the second housing structure 220. When the first housing structure 210 and the second housing structure 220 are folded or unfolded, the distance (or isolation) between the first antenna 511 and the second antenna 512 may vary. For example, the distance between the first antenna 511 and the second antenna 512 may decrease when the first housing structure 210 and the second housing structure 220 are folded. If the first housing structure 210 and the second housing structure 220 are folded in the state in which the electronic device 410 operates in the STR mode (or in the state in which data having a high MCS level is transmitted or received), the STR mode of the electronic device 410 may not be effectively operated as the distance between the first antenna 511 and the second antenna 512 is reduced.

The processor 530 may detect a change in the angle between the first housing structure 210 and the second housing structure 220. The processor 530 may detect a change in the angle between the first housing structure 210 and the second housing structure 220 in a manner of receiving, from the application processor 120, information related to a change in the angle between the first housing structure 210 and the second housing structure 220. The information related to a change in the angle may include the amount of change in the angle between the first housing structure 210 and the second housing structure 220 and/or information indicating whether or not the amount of change in the angle between the first housing structure 210 and the second housing structure 220 is greater than or equal to a specified value.

The processor 530 may be operatively connected to a sensor (not shown) that measures the angle between the first housing structure 210 and the second housing structure 220. The processor 530 may detect occurrence of an event in which the angle between the first housing structure 210 and the second housing structure 220 changes, based on data received from the sensor measuring the angle.

According to various embodiments of the disclosure, the processor 530 may detect occurrence of an event in which the angle between the first housing structure 210 and the second housing structure 220 changes using at least one sensor (e.g., a Hall sensor) capable of identifying a folding state of the electronic device 410 (e.g., the folded state of the electronic device 410, the unfolded state of the electronic device 410).

The processor 530 may measure the angle between the first housing structure 210 and the second housing structure 220, based on the sensor, and identify whether or not the angle satisfies a specified condition. The specified condition may indicate a condition related to the distance between the first antenna 511 and the second antenna 512. The distance between the first antenna 511 and the second antenna 512 may increase as the angle between the first housing structure 210 and the second housing structure 220 increases. The distance between the first antenna 511 and the second antenna 512 may decrease as the angle between the first housing structure 210 and the second housing structure 220 decreases.

Alternatively or additionally, in the case where the processor 530 receives, from the application processor 120, information indicating that the amount of change in the angle between the first housing structure 210 and the second housing structure 220 satisfies a specified condition (e.g., information indicating that a condition in which the angle between the first housing structure 210 and the second housing structure 220 is greater than or equal to a specified value is satisfied), the operation of determining whether or not a specified condition is satisfied may be omitted.

The processor 530, based on whether or not the angle satisfies the specified condition, may control the communication circuit 520 to transmit a signal related to a change in the operation of short-range wireless communication through at least one of the first link 431 and/or the second link 432.

The signal related to a change in the operation of short-range wireless communication may include information instructing to switch to any one of the STR mode and/or the non-STR mode. The information instructing to switch to any one of the STR mode and/or the non-STR mode may be included in an action frame among management frames defined in IEEE 802.11.

According to an embodiment, the processor 530 may control the communication circuit 520 to operate in the STR mode in the unfolded state of the foldable housing. The processor 530 may detect that the foldable housing is folded and identify whether or not the angle of the first housing structure 210 and the second housing structure 220 satisfies a specified condition. The specified condition may include whether or not the angle of the first housing structure 210 and the second housing structure 220 is less than or equal to a specified value. Based on the case where the angle satisfies a specified condition, the processor 530 may control the communication circuit 520 to switch from the STR mode to the non-STR mode. The processor 530 may control the communication circuit 520 to transmit information indicating switching to the non-STR mode to the external electronic device 420. The processor 530 may change a value of a field (e.g., NSTR bitmap) indicating the STR mode, which is included in the management frame (or action frame), to a value indicating the non-STR mode and control the communication circuit 520 to transmit a signal including the changed field to the external electronic device 420. Through the above method, the electronic device 410 may reduce degradation of the quality of short-range wireless communication caused by a decrease in the distance between the first antenna 511 and the second antenna 512 as the foldable housing is folded by switching to the non-STR mode.

According to an embodiment, the processor 530 may control the communication circuit 520 to operate in the non-STR mode in the state in which the foldable housing is folded. The processor 530 may detect that the foldable housing is unfolded and identify whether or not the angle of the first housing structure 210 and the second housing structure 220 satisfies a specified condition. The specified condition may include whether or not the angle of the first housing structure 210 and the second housing structure 220 is greater than or equal to a specified value. Based on the case where the angle satisfies a specified condition, the processor 530 may control the communication circuit 520 to switch from the non-STR mode to the STR mode. The processor 530 may control the communication circuit 520 to transmit information indicating switching to the STR mode to the external electronic device 420. The processor 530 may change a value of a field (e.g., NSTR bitmap) indicating the STR mode, which is included in the management frame (or action frame), to a value indicating the STR mode and control the communication circuit 520 to transmit a signal including the changed field to the external electronic device 420. Through the above method, the electronic device 410 may improve the quality of short-range wireless communication when the distance between the first antenna 511 and the second antenna 512 increases as the foldable housing is unfolded by switching to the STR mode that provides higher performance.

The signal related to a change in the operation of short-range wireless communication may include information for changing an MCS level. The information for changing an MCS level (e.g., high efficiency adaptation (HEA) control) may be included in a control frame defined in IEEE 802.11. According to an embodiment, the information for changing an MCS level may be included in a header of a signal transmitted through a medium access control (MAC) layer.

According to an embodiment, the processor 530 may produce data corresponding to a first level of the MCS level in the unfolded state of the foldable housing and control the communication circuit 520 to transmit the produced data. Alternatively or additionally, the processor 530 may receive data corresponding to the first level of the MCS level in the unfolded state of the foldable housing and decode the received data. The processor 530 may detect that the foldable housing is folded and identify whether or not the angle of the first housing structure 210 and the second housing structure 220 satisfies a specified condition. The specified condition may include whether or not the angle of the first housing structure 210 and the second housing structure 220 is less than or equal to a specified value. Based on the case where the angle satisfies a specified condition, the processor 530 may perform a series of operations for setting the MCS level to a second level lower than the first level. The processor 530 may control the communication circuit 520 to transmit information for reducing the MCS level to the external electronic device 420. The external electronic device 420 and the electronic device 410 may perform a series of operations for reducing the MCS level. The electronic device 410 may reduce degradation of the quality of short-range wireless communication caused by a decrease in the distance between the first antenna 511 and the second antenna 512 as the foldable housing is folded by transmitting or receiving data having a low MCS level.

According to an embodiment, the processor 530 may produce data corresponding to a second level of the MCS level, which is lower than the first level, in the folded state of the foldable housing and control the communication circuit 520 to transmit the produced data. Alternatively or additionally, the processor 530 may receive data corresponding to the first level of the MCS level in the unfolded state of the foldable housing and decode the received data. The processor 530 may detect that the foldable housing is unfolded and identify whether or not the angle of the first housing structure 210 and the second housing structure 220 satisfies a specified condition. The specified condition may include whether or not the angle of the first housing structure 210 and the second housing structure 220 is greater than or equal to a specified value. Based on the case where the angle satisfies a specified condition, the processor 530 may perform a series of operations to increase the MCS level. Through the above method, the electronic device 410 may improve the quality of short-range wireless communication when the distance between the first antenna 511 and the second antenna 512 increases as the foldable housing is unfolded by transmitting and receiving data a higher MCS level that provides higher performance.

The signal related to a change in the operation of short-range wireless communication may include information for changing an operation mode of short-range wireless communication. The operation mode of short-range wireless communication may include a channel width, the number of space time streams ($N_{STS}$), and/or the number of spatial streams ($N_{SS}$) of short-range wireless communication (or the first link 341 and/or the second link 342). According to an embodiment, the information for changing the operation mode of short-range wireless communication may be included in a header of a signal transmitted through a medium access control (MAC) layer.

According to an embodiment, the processor 530, in the unfolded state of the foldable housing, may control the communication circuit 520 to operate in a first operation mode (e.g., the number of spatial streams having a first value, the number of space time streams having a second value, and/or a channel width having a first size). The processor 530 may detect that the foldable housing is folded and identify whether or not the angle of the first housing structure 210 and the second housing structure 220 satisfies a specified condition. The specified condition may include whether or not the angle of the first housing structure 210 and the second housing structure 220 is less than or equal to a specified value. Based on the case where the angle satisfies a specified condition, the processor 530 may perform a series of operations to operate in a second operation mode (e.g., the number of spatial streams having a third value less than the first value, the number of space time streams having a fourth value less than the second value, and/or a channel width having a second size smaller than the first size). The processor 530 may control the communication circuit 520 to transmit information indicating that the electronic device 410 operates in the second operation mode to the external electronic device 420. The external electronic device 420 and the electronic device 410 may perform a series of operations to switch from the first operation mode to the second operation mode. The electronic device 410 may reduce degradation of the quality of short-range wireless communication caused by a decrease in the distance between the first antenna 511 and the second antenna 512 as the foldable housing is folded by operating in the second operation mode that requires a smaller distance between the first antenna 511 and the second antenna 512.

According to an embodiment, the processor 530, in the folded state of the foldable housing, may control the communication circuit 520 to operate in the second operation mode. The processor 530 may detect that the foldable housing is unfolded and identify whether or not the angle of the first housing structure 210 and the second housing structure 220 satisfies a specified condition. The specified condition may include whether or not the angle of the first housing structure 210 and the second housing structure 220 is greater than or equal to a specified value. Based on the case where the angle satisfies a specified condition, the processor 530 may perform a series of operations to switch to the first operation mode. The processor 530 may control the communication circuit 520 to transmit information indicating that the electronic device 410 operates in the first operation mode to the external electronic device 420. The external electronic device 420 and the electronic device 410 may perform a series of operations to switch from the second operation mode to the first operation mode. Through the above method, the electronic device 410 may improve the quality of short-range wireless communication when the distance between the first antenna 511 and the second antenna 512 increases as the foldable housing is unfolded by operating in the first operation mode that provides higher performance.

The disclosure is not limited to the embodiments described above (e.g., switching to the STR mode or the non-STR mode, changing the MCS level, or changing the operation mode) and may be applied to various cases of changing the operation of short-range wireless communication, which may occur according to the folding of the foldable housing.

The disclosure may be applied to an electronic device implemented in the form of a rollable housing (or a slidable housing), as well as to the foldable housing described above.

According to various embodiments of the disclosure, the electronic device 410 may be implemented in the form of a rollable housing (or a slidable housing) in which a first housing structure (e.g., the first housing 310 in FIG. 3A) and a second housing structure (e.g., the second housing 320 in FIG. 3A) are coupled to be movable in a specified direction and within a specified distance. The first antenna 511 may be implemented inside the first housing structure 310, and the second antenna 512 may be implemented inside the second housing structure 320. When the first housing structure 310 and the second housing structure 320 are in a slide-in or slide-out state, the distance (or isolation) between the first antenna 511 and the second antenna 512 may vary. For example, the distance between the first antenna 511 and the second antenna 512 may decrease when the first housing structure 310 and the second housing structure 320 are in the slide-in state. If the distance between the first housing structure 310 and the second housing structure 320 is reduced in the state in which the electronic device 410 operates in the STR mode (or in the state in which data having a high MCS level is transmitted or received), the STR mode of the electronic device 410 may not be effectively operated as the distance between the first antenna 511 and the second antenna 512 is reduced.

The processor 530 may detect the degree to which the second housing structure 320 slides into (or the degree to which the second housing structure slides out of) the first housing structure 310. The processor 530 may detect the degree to which the second housing structure 320 slides in by a method of receiving, from the application processor 120, information related to the degree to which the second housing structure 320 slides in. The information related to the degree to which the second housing structure 320 slides in may include the degree to which the second housing structure 320 slides in and/or information indicating whether or not the degree to which the second housing structure 320 slides in satisfies a specified condition (e.g., a condition in which the degree to which the second housing structure 320 slides in is less than or equal to a specified value).

The processor 530 may measure the degree to which the second housing structure 320 slides in, based on a sensor, and identify whether or not the degree to which the second housing structure 320 slides in satisfies a specified condition. The specified condition may indicate a condition related to the distance between the first antenna 511 and the second antenna 512. The distance between the first antenna 511 and the second antenna 512 may be reduced as the degree to which the second housing structure 320 slides in increases. The distance between the first antenna 511 and the second antenna 512 may increase as the degree to which the second housing structure 320 slides out increases.

Alternatively or additionally, in the case where the processor 530 receives, from the application processor 120, information indicating that the degree to which the second housing structure 320 slides in satisfies a specified condition, the operation of determining whether or not the specified condition is satisfied may be omitted.

Based on whether or not the degree to which the second housing structure 320 slides in satisfies a specified condition, the processor 530 may control the communication circuit 520 to transmit a signal related to a change in the operation of short-range wireless communication through at least one of the first link 431 and/or the second link 432.

The signal related to a change in the operation of short-range wireless communication may include information instructing to switch to any one of the STR mode and/or the non-STR mode. The information instructing to switch to any one of the STR mode and/or the non-STR mode may be included in an action frame among management frames defined in IEEE 802.11.

According to an embodiment, the processor 530 may control the communication circuit 520 to operate in the STR mode in the unrolled state of the rollable housing. The processor 530 may detect that the second housing structure 320 slides into the first housing structure 310 and identify whether or not the degree to which the second housing structure 320 slides in satisfies a specified condition. The specified condition may include a condition in which the degree to which the second housing structure 320 slides in is greater than or equal to a specified value. Based on the case where the degree of sliding-in satisfies a specified condition, the processor 530 may control the communication circuit 520 to switch from the STR mode to the non-STR mode. The processor 530 may control the communication circuit 520 to transmit information indicating switching to the non-STR mode to the external electronic device 420. The processor 530 may change a value of a field (e.g., NSTR bitmap) indicating the STR mode, which is included in the management frame (or action frame), to a value indicating the non-STR mode and control the communication circuit 520 to transmit a signal including the changed field to the external electronic device 420. Through the above method, the electronic device 410 may reduce degradation of the quality of short-range wireless communication caused by a decrease in the distance between the first antenna 511 and the second antenna 512 as the rollable housing slides in by switching to the non-STR mode.

According to an embodiment, the processor 530 may control the communication circuit 520 to operate in the non-STR mode when the rollable housing is in the slide-in state. The processor 530 may detect sliding-out of the rollable housing and identify whether or not the degree to which the second housing structure 320 slides in satisfies a specified condition. The specified condition may include a condition in which the degree to which the second housing structure 320 slides in is less than or equal to a specified value. Based on the case where the degree of sliding-in satisfies a specified condition, the processor 530 may control the communication circuit 520 to switch from the non-STR mode to the STR mode. The processor 530 may control the communication circuit 520 to transmit information indicating switching to the STR mode to the external electronic device 420. The processor 530 may change a value of a field (e.g., NSTR bitmap) indicating the STR mode, which is included in the management frame (or action frame), to a value indicating the STR mode and control the communication circuit 520 to transmit a signal including the changed field to the external electronic device 420. Through the above method, the electronic device 410 may improve the quality of short-range wireless communication when the distance between the first antenna 511 and the second antenna 512 increases as the rollable housing slides out by switching to the STR mode that provides higher performance.

The signal related to a change in the operation of short-range wireless communication may include information for changing an MCS level. The information for changing an MCS level (e.g., high efficiency adaptation (HEA) control) may be included in a control frame defined in IEEE 802.11. According to an embodiment, the information for changing an MCS level may be included in a header of a signal transmitted through a medium access control (MAC) layer.

According to an embodiment, the processor 530 may produce data corresponding to a first level of the MCS level in the slide-out state of the rollable housing and control the communication circuit 520 to transmit the produced data. Alternatively or additionally, the processor 530 may receive data corresponding to the first level of the MCS level in the slide-out state of the rollable housing and decode the received data. The processor 530 may detect that the second housing structure 320 slides in and identify whether or not the degree to which the second housing structure 320 slides in satisfies a specified condition. The specified condition may include whether or not the degree to which the second housing structure 320 slides in is greater than or equal to a specified value. Based on the case where the degree of sliding-in satisfies a specified condition, the processor 530 may perform a series of operations to set the MCS level to a second level lower than the first level. The processor 530 may control the communication circuit 520 to transmit information for reducing the MCS level to the external electronic device 420. The external electronic device 420 and the electronic device 410 may perform a series of operations to reduce the MCS level. The electronic device 410 may reduce degradation of the quality of short-range wireless communication caused by a decrease in the distance between the first antenna 511 and the second antenna 512 as the rollable housing slides in by transmitting or receiving data having a low MCS level.

According to an embodiment, the processor 530 may produce data corresponding to a second level of the MCS level, which is lower than the first level, when the rollable housing is in the slide-in state, and control the communication circuit 520 to transmit the produced data. Alternatively or additionally, the processor 530 may receive data corresponding to the second level of the MCS level when the rollable housing is in the slide-in state and decode the received data. The processor 530 may detect that the second housing structure 320 slides out and identify whether or not the degree to which the second housing structure 320 slides in satisfies a specified condition. The specified condition may include whether or not the degree to which the second housing structure 320 slides in is less than or equal to a specified value. Based on the case where the degree of sliding-in satisfies a specified condition, the processor 530 may perform a series of operations to increase the MCS level. Through the above method, the electronic device 410 may improve the quality of short-range wireless communication when the distance between the first antenna 511 and the second antenna 512 increases as the rollable housing slides out by transmitting and receiving data a higher MCS level that provides higher performance.

The signal related to a change in the operation of short-range wireless communication may include information for changing an operation mode of short-range wireless communication. The operation mode of short-range wireless communication may include a channel width, the number of space time streams ($N_{STS}$), and/or the number of spatial streams ($N_{SS}$) of short-range wireless communication (or the first link 341 and/or the second link 342). According to an embodiment, the information for changing the operation mode of short-range wireless communication may be included in a header of a signal transmitted through a medium access control (MAC) layer.

According to an embodiment, the processor 530, when the rollable housing is in the slide-out state, may control the communication circuit 520 to operate in a first operation mode (e.g., the number of spatial streams having a first value, the number of space time streams having a second value, and/or a channel width having a first size). The processor 530 may detect that the second housing structure 320 slides out and identify whether or not the degree to which the second housing structure 320 slides in satisfies a specified condition. The specified condition may include whether or not the degree to which the second housing structure 320 slides in is greater than or equal to a specified value. Based on the case where the degree of sliding-in satisfies a specified condition, the processor 530 may perform a series of operations to operate in a second operation mode (e.g., the number of spatial streams having a third value less than the first value, the number of space time streams having a fourth value less than the second value, and/or a channel width having a second size smaller than the first size). The processor 530 may control the communication circuit 520 to transmit information indicating that the electronic device 410 operates in the second operation mode to the external electronic device 420. The external electronic device 420 and the electronic device 410 may perform a series of operations to switch from the first operation mode to the second operation mode. The electronic device 410 may reduce degradation of the quality of short-range wireless communication caused by a decrease in the distance between the first antenna 511 and the second antenna 512 as the rollable housing slides in by operating in the second operation mode that requires a smaller distance between the first antenna 511 and the second antenna 512.

According to an embodiment, the processor 530 may control the communication circuit 520 to operate in the second operation mode when the rollable housing is in the slide-in state. The processor 530 may detect that the second housing structure slides out and identify whether or not the degree to which the second housing structure 320 slides in satisfies a specified condition. The specified condition may include whether or not the degree to which the second housing structure 320 slides in is less than or equal to a specified value. Based on the case where the degree of sliding-in satisfies a specified condition, the processor 530 may perform a series of operations to switch to the first operation mode. The processor 530 may control the communication circuit 520 to transmit information indicating that the electronic device 410 operates in the first operation mode to the external electronic device 420. The external electronic device 420 and the electronic device 410 may perform a series of operations to switch from the second operation mode to the first operation mode. Through the above method, the electronic device 410 may improve the quality of short-range wireless communication when the distance between the first antenna 511 and the second antenna 512 increases as the rollable housing slides out by operating in the first operation mode that provides higher performance.

The embodiments described above may be embodiments derived as the distance between the first antenna 511 and the second antenna 512 changes. However, although the distance between the first antenna 511 and the second antenna 512 is reduced, if a difference between the frequency band of the first link 341 and the frequency band of the second link 342 corresponds to the extent capable of producing appropriate performance, the electronic device 410 may not transmit a signal for changing the operation of short-range wireless communication.

The processor 530 may identify whether or not a difference between the frequency band corresponding to the first link 431 and the frequency band corresponding to the second link 432 is greater than or equal to a specified value and, based on the identified result, determine whether or not to transmit a signal related to a change in the operation of short-range wireless communication.

The processor 530, in response to a difference between the frequency band corresponding to the first link 431 and the frequency band corresponding to the second link 432, which is less than or equal to a specified value, may identify whether or not the angle of the first housing structure 210 and the second housing structure 220 (or the degree to which the second housing structure 320 slides in) satisfies a specified condition. Based on the case where the angle of the first housing structure 210 and the second housing structure 220 (or the degree to which the second housing structure 320 slides in) satisfies the specified condition, the processor 530 may transmit a signal related to a change in the operation of short-range wireless communication to the external electronic device 420.

The processor 530, in response to a difference between the frequency band corresponding to the first link 431 and the frequency band corresponding to the second link 432, which is greater than or equal to a specified value, may determine to not transmit a signal related to a change in the operation of short-range wireless communication. Alternatively or additionally, the processor 530, in response to a difference between the frequency band corresponding to the first link 431 and the frequency band corresponding to the second link 432, which is greater than or equal to a specified value, may determine to not transmit a signal related to a change in the operation of short-range wireless communication, regardless of a change in the angle of the first housing structure 210 and the second housing structure 220.

The processor 530 may change the characteristics of a service using short-range wireless communication as the operation of short-range wireless communication changes.

In the state in which the first housing structure 210 and the second housing structure 220 satisfy a specified condition, the processor 530 may perform short-range wireless communication through a communication mode (e.g., a non-STR mode) capable of providing relatively low quality. When it is identified that the first housing structure 210 and the second housing structure 220 do not satisfy a specified condition, the processor 530 may provide short-range wireless communication through a communication mode (e.g., an STR mode) capable of providing relatively high quality.

In the case where the processor 530 is able to use a communication mode capable of providing relatively high quality, the processor 530 may change characteristics of a service using short-range wireless communication. According to an example, in the case where the processor 530 is able to use a communication mode capable of providing relatively high quality while providing a content providing service (e.g., a streaming service) or a call service (e.g., a video call or a voice call), the processor 530 may change the characteristics of a service using short-range wireless communication in order to receive higher quality content or receive higher quality videos or voices.

Alternatively, in the case where the processor 530 is able to use a communication mode capable of providing relatively high quality while providing a content providing service (e.g., a streaming service) or a call service (e.g., a video call or a voice call), the processor 530 may provide a user interface (e.g., screen, sound, or vibration) for inducing a change in the characteristics of a service using short-range wireless communication in order to receive higher quality videos or voices. The processor 530 may change the characteristics of a service using short-range wireless communication according to a user input onto the user interface.

The processor 530 may perform short-range wireless communication through a communication mode (e.g., an STR mode) capable of providing relatively high quality in the state in which the first housing structure 210 and the second housing structure 220 do not satisfy a specified condition. If the processor 530 identifies that the first housing structure 210 and the second housing structure 220 satisfy a specified condition, the processor 530 may provide short-range wireless communication through a communication mode (e.g., a non-STR mode) having relatively low quality but capable of providing a high data transmission or reception success rate.

The processor 530 may change the characteristics of a service using short-range wireless communication in the situation in which a communication mode (e.g., a non-STR mode) capable of providing a high data transmission or reception success rate is provided. According to an example, in the case where the processor 530 is able to use a communication mode capable of providing relatively low quality while providing a content providing service (e.g., a streaming service) or a call service (e.g., a video call or a voice call), the processor 530 may change the characteristics of a service using short-range wireless communication in order to receive lower quality content or receive lower quality videos or voices.

Alternatively, in the case where the processor 530 is able to use a communication mode capable of providing relatively low quality while providing a content providing service (e.g., a streaming service) or a call service (e.g., a video call or a voice call), the processor 530 may provide a user interface (e.g., screen, sound, or vibration) for inducing a change in the characteristics of a service using short-range wireless communication in order to receive lower quality videos or voices. The processor 530 may change the characteristics of a service using short-range wireless communication according to a user input onto the user interface.

FIGS. 6A, 6B, 6C and 6D are diagrams illustrating an embodiment in which an electronic device according to various embodiments of the disclosure changes the operation of short-range wireless communication, based on a change in the angle of a first housing structure and a second housing structure.

Figure 6A:
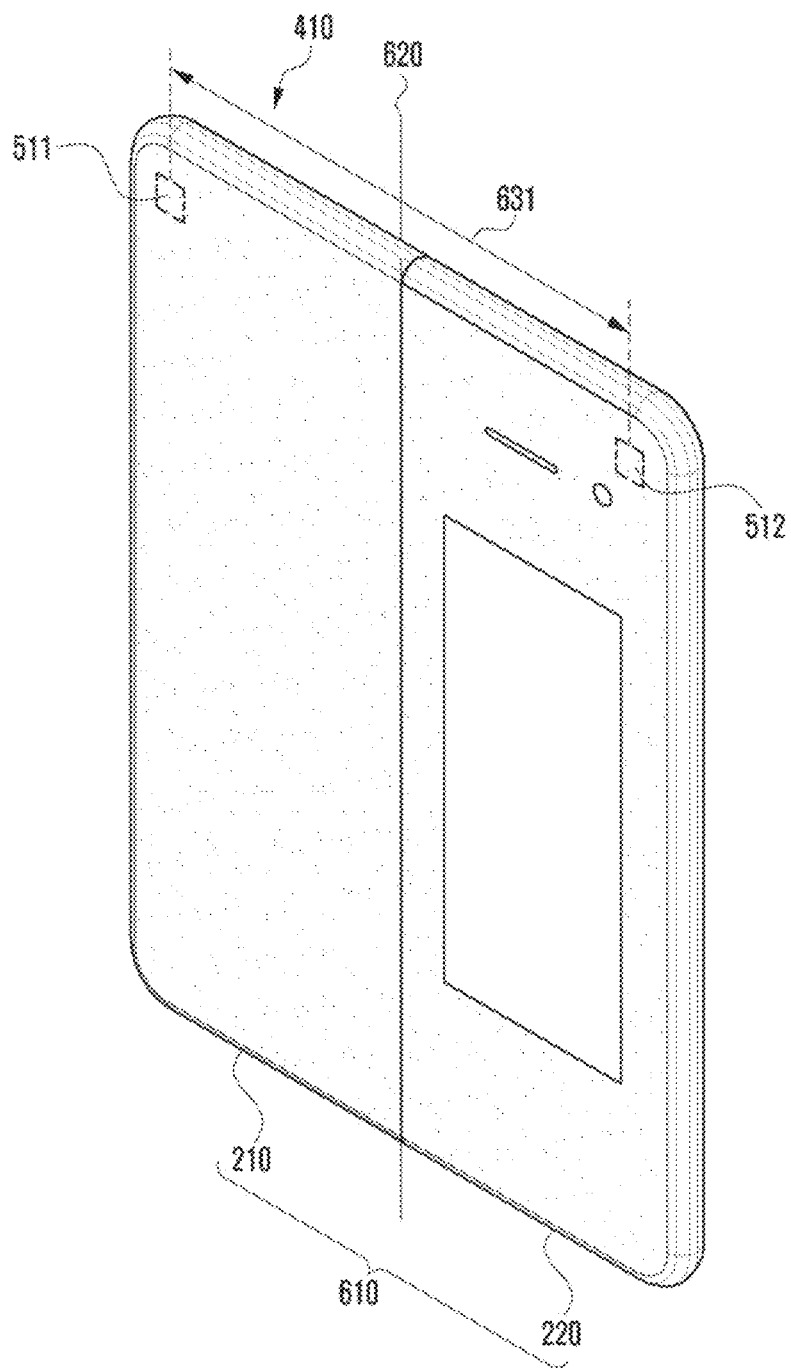
FIGS. 6A, 6B, 6C and 6D are diagrams illustrating an embodiment in which an electronic device according to various embodiments of the disclosure changes the operation of short-range wireless communication, based on a change in the angle of a first housing structure and a second housing structure.

Referring to FIG. 6A, an electronic device (e.g., the electronic device 410 in FIG. 5) may include a foldable housing 610 including a first housing 210 and a second housing 220.

According to various embodiments of the disclosure, the second housing 220 may be coupled to the first housing 210 to be foldable. The first housing 210 and the second housing 220 may be foldable to each other about a folding axis 620 (e.g., the folding axis (e.g., axis A) in FIG. 2A) extending in a first direction. The first housing 210 and the second housing 220 may be disposed to face, at least in part, each other in a folded state.

Referring to FIG. 6A, the angle formed between the first housing 210 and the second housing 220 may be 180 degrees. If the angle formed between the first housing 210 and the second housing 220 is greater than or equal to a predetermined angle, the electronic device 300 may be referred to as being in an unfolded state. The predetermined angle may be 180 degrees, but it may vary according to the intention of a designer. When the electronic device 200 is in the unfolded state, the first housing 210 and the second housing 220 may form a planar structure.

Figure 6B:
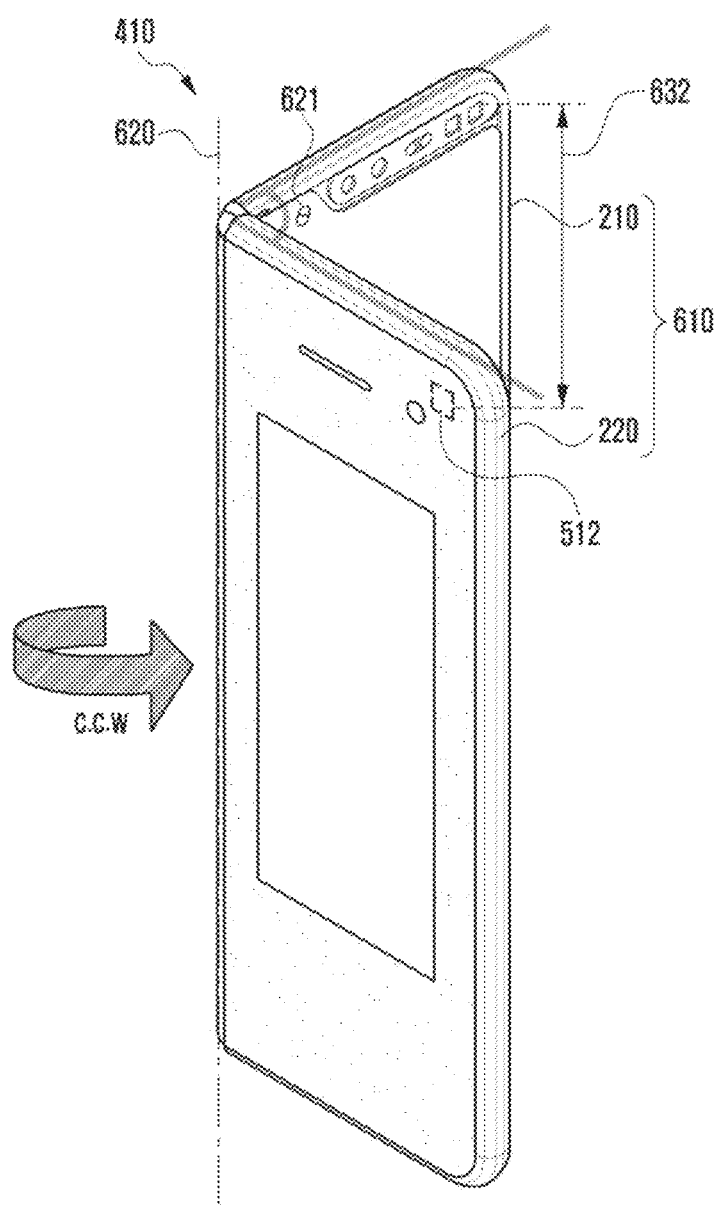
Figure 6C:
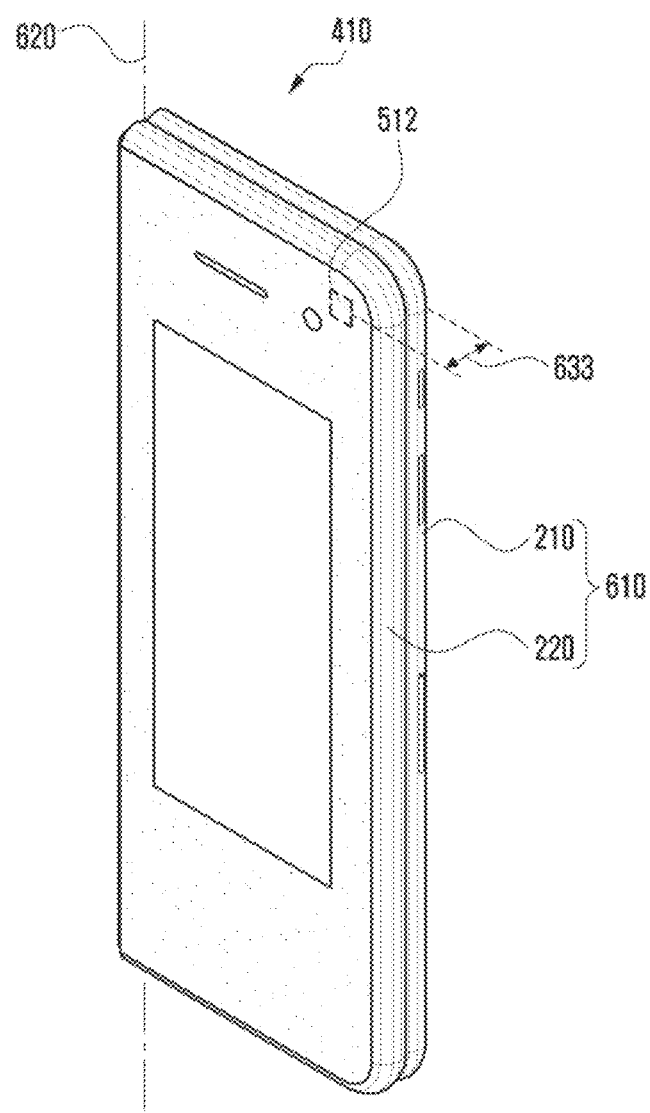

FIG. 6B illustrates the electronic device 410 that is folded in a counterclockwise (C.C.W.) direction around a folding axis 620 according to various embodiments of the disclosure, and FIG. 6C illustrates the electronic device 410 that is fully folded about the center line of the folding axis 620 according to various embodiments of the disclosure.

FIGS. 6B and 6C, the user of the electronic device 410 may apply a force to the electronic device 200 in the unfolded state to fold the foldable housing 610 of the electronic device 410 about the folding axis 620.

The angle 621 between the first housing structure 210 and the second housing structure 220 may be greatest when the foldable housing 610 is fully unfolded (FIG. 6A) and may be reduced while the foldable housing 610 is folded. The angle 621 may be smallest when the foldable housing 610 is fully folded (FIG. 6C).

A first antenna (e.g., the first antenna 511 in FIG. 5) may be disposed inside the first housing 210, and a second antenna (e.g., the second antenna 512 in FIG. 5) may be disposed inside the second housing 220. The distance 631 between the first antenna 511 and the second antenna 512 may vary as the first housing 210 and the second housing 220 are folded (or unfolded) about the folding axis 620. The distance 631 may be greatest when the foldable housing 610 is fully unfolded (e.g., FIG. 6A) and may be reduced while the foldable housing 610 is folded. When the foldable housing 610 is partially folded (e.g., FIG. 6B), the distance 632 between the first antenna 511 and the second antenna 512 may be smaller than the distance 631 when the foldable housing 610 is fully unfolded. When the foldable housing 610 is fully folded (e.g., FIG. 6C), the distance 633 between the first antenna 511 and the second antenna 512 may be less than the distance 632. That is, the distances 631, 632, and 633 may be correlated with the angle 621.

The electronic device 410 may measure an angle between the first housing structure 210 and the second housing structure 220, based on a sensor, and identify whether or not the angle satisfies a specified condition. The specified condition may indicate a condition related to the distance between the first antenna 511 and the second antenna 512. The distance between the first antenna 511 and the second antenna 512 may increase as the angle between the first housing structure 210 and the second housing structure 220 increases. The distance between the first antenna 511 and the second antenna 512 may decrease as the angle between the first housing structure 210 and the second housing structure 220 decreases.

Based on whether or not the angle satisfies a specified condition, the electronic device 410 may control the communication circuit 520 to transmit a signal related to a change in the operation of short-range wireless communication through at least one of the first link 431 and/or the second link 432.

The signal related to a change in the operation of short-range wireless communication may include information instructing to switch to any one of the STR mode and/or the non-STR mode. The information instructing to switch to any one of the STR mode and/or the non-STR mode may be included in an action frame among management frames defined in IEEE 802.11.

Based on the case where the angle satisfies a specified condition, the electronic device 410 may transmit, to the external electronic device 420, a signal including information instructing to switch to any one of the STR mode and/or the non-STR mode.

The signal related to a change in the operation of short-range wireless communication may include information for changing an MCS level. The information for changing an MCS level (e.g., high efficiency adaptation (HEA) control) may be included in a control frame defined in IEEE 802.11. According to an embodiment, the information for changing an MCS level may be included in a header of a signal transmitted through a medium access control (MAC) layer.

Based on the case where the angle satisfies a specified condition, the electronic device 410 may transmit a signal for changing the MCS level to the external electronic device 420.

The signal related to a change in the operation of short-range wireless communication may include information for changing an operation mode of short-range wireless communication. The operation mode of short-range wireless communication may include a channel width, the number of space time streams ($N_{STS}$), and/or the number of spatial streams ($N_{SS}$) of short-range wireless communication (or the first link 341 and/or the second link 342). According to an embodiment, the information for changing the operation mode of short-range wireless communication may be included in a header of a signal transmitted through a medium access control (MAC) layer.

Based on the case where the angle satisfies a specified condition, the electronic device 410 may transmit a signal for changing the operation mode of short-range wireless communication to the external electronic device 420.

Figure 6D:
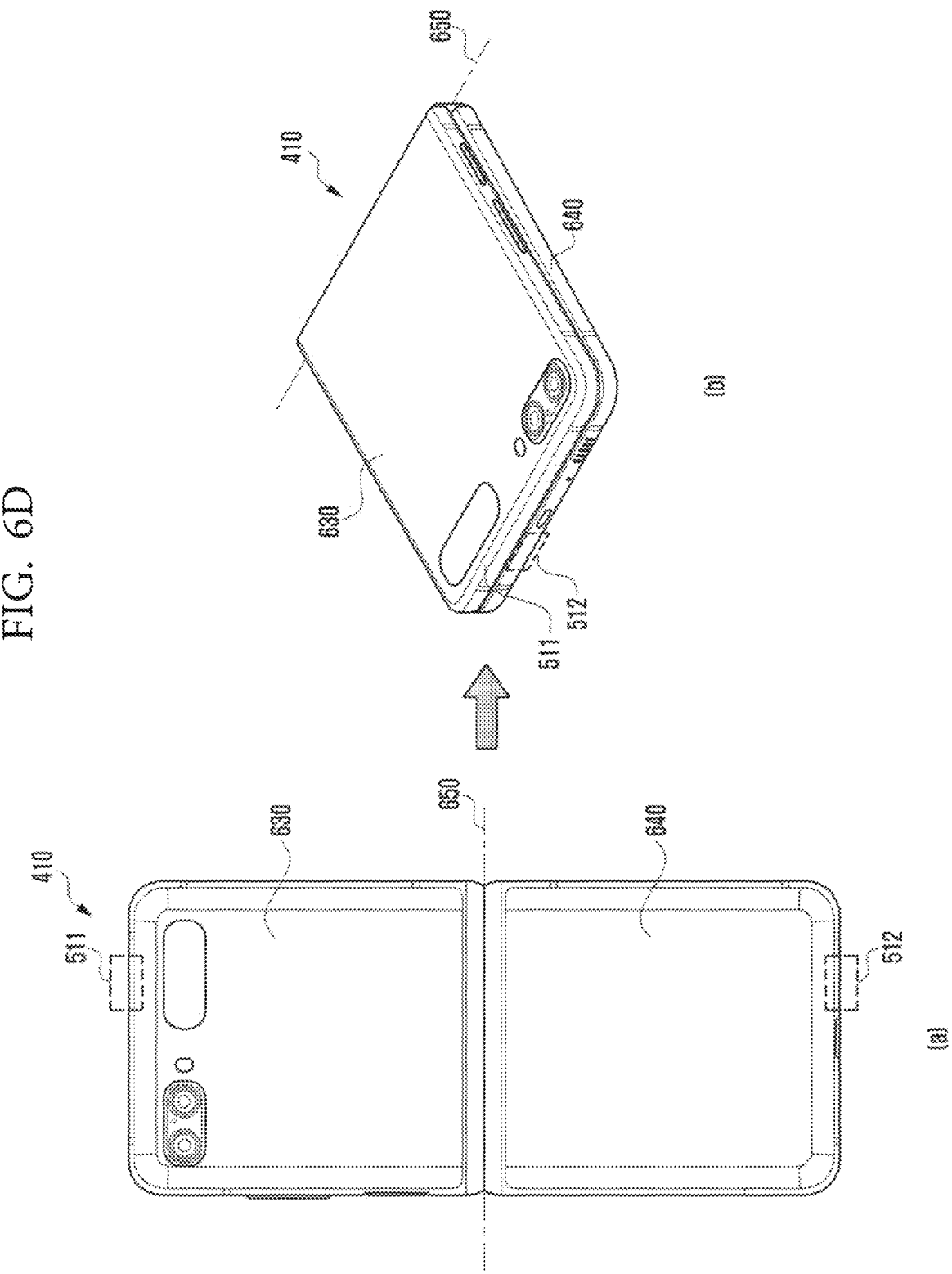

FIG. 6D is a diagram illustrating an embodiment of changing the operation of short-range wireless communication while an electronic device 410 is folded or unfolded about a folding axis 650 according to various embodiments of the disclosure.

The user of the electronic device 410 may fold the foldable housing of the electronic device 410 in the unfolded state about the folding axis 620 by applying a force to the electronic device 410.

The angle between the first housing structure 630 and the second housing structure 640 may be greatest when the foldable housing is fully unfolded (e.g., (a) in FIG. 6D) and may be reduced as the foldable housing is folded. The angle 621 may be smallest when the foldable housing 610 is fully folded (e.g., (b) in FIG. 6D).

A first antenna (e.g., the first antenna 511 in FIG. 5) may be disposed inside the first housing structure 630 or on the first housing structure 630, and a second antenna (e.g., the second antenna 512 in FIG. 5) may be disposed inside the second housing structure 640 or on the second housing structure 640. The first antenna 511 may be disposed in various spaces of the first housing structure 630, and disposition of the first antenna 511 is not limited to a specific position. The second antenna 512 may be disposed in various spaces of the second housing structure 640, and disposition of the first antenna 511 is not limited to a specific position. Although one first antenna 511 and one second antenna 512 are shown in the drawing, the number of antennas is not limited. The distance between the first antenna 511 and the second antenna 512 may vary depending on folding (or unfolding) of the first housing structure 630 and the second housing structure 640 about the folding axis 650. The distance may be greatest when the foldable housing is fully unfolded (e.g., (a) in FIG. 6D) and may be reduced as the foldable housing is folded. When the foldable housing is fully folded (e.g., (b) in FIG. 6D), the distance between the first antenna 511 and the second antenna 512 may be less than the distance 632. That is, the distance may have a correlation with the angle.

The electronic device 410 may measure the angle between the first housing structure 630 and the first housing structure 640, based on a sensor, and identify whether or not the angle satisfies a specified condition. The specified condition may indicate a condition related to a distance between the first antenna 511 and the second antenna 512. The distance between the first antenna 511 and the second antenna 512 may increase as the angle between the first housing structure 630 and the first housing structure 640 increases. The distance between the first antenna 511 and the second antenna 512 may decrease as the angle between the first housing structure 630 and the first housing structure 640 decreases.

The electronic device 410 may control the communication circuit 520 to transmit a signal related to a change in the operation of short-range wireless communication through at least one of the first link 431 and/or the second link 432, based on whether or not the angle satisfies a specified condition.

The signal related to a change in the operation of short-range wireless communication may include information instructing to switch to any one of the STR mode and/or the non-STR mode. The information instructing to switch to any one of the STR mode and/or the non-STR mode may be included in an action frame among the management frames defined in IEEE 802.11.

The electronic device 410, based on the case the angle satisfying a specified condition, may transmit a signal including information instructing to switch to any one of the STR mode and/or the non-STR mode to the external electronic device 420.

The signal related to a change in the operation of short-range wireless communication may include information for changing an MCS level. The information for changing an MCS level (e.g., high efficiency adaptation (HEA) control) may be included in a control frame defined in IEEE 802.11. According to an embodiment, information for changing an MCS level may be included in a header of a signal transmitted through a medium access control (MAC) layer.

The electronic device 410 may transmit a signal for changing an MCS level to the external electronic device 420, based on the angle satisfying a specified condition.

The signal related to a change in the operation of short-range wireless communication may include information for changing an operation mode of short-range wireless communication. The operation mode of short-range wireless communication may include a channel width, the number of space time streams ($N_{STS}$), and/or the number of spatial streams ($N_{SS}$) of short-range wireless communication (or the first link 341 and/or the second link 342). According to an embodiment, the information for changing an operation mode of short-range wireless communication may be included in a header of a signal transmitted through a medium access control (MAC) layer.

The electronic device 410 may transmit the signal for changing an operation mode of short-range wireless communication to the external electronic device 420, based on the angle satisfying a specified condition.

Figure 7:
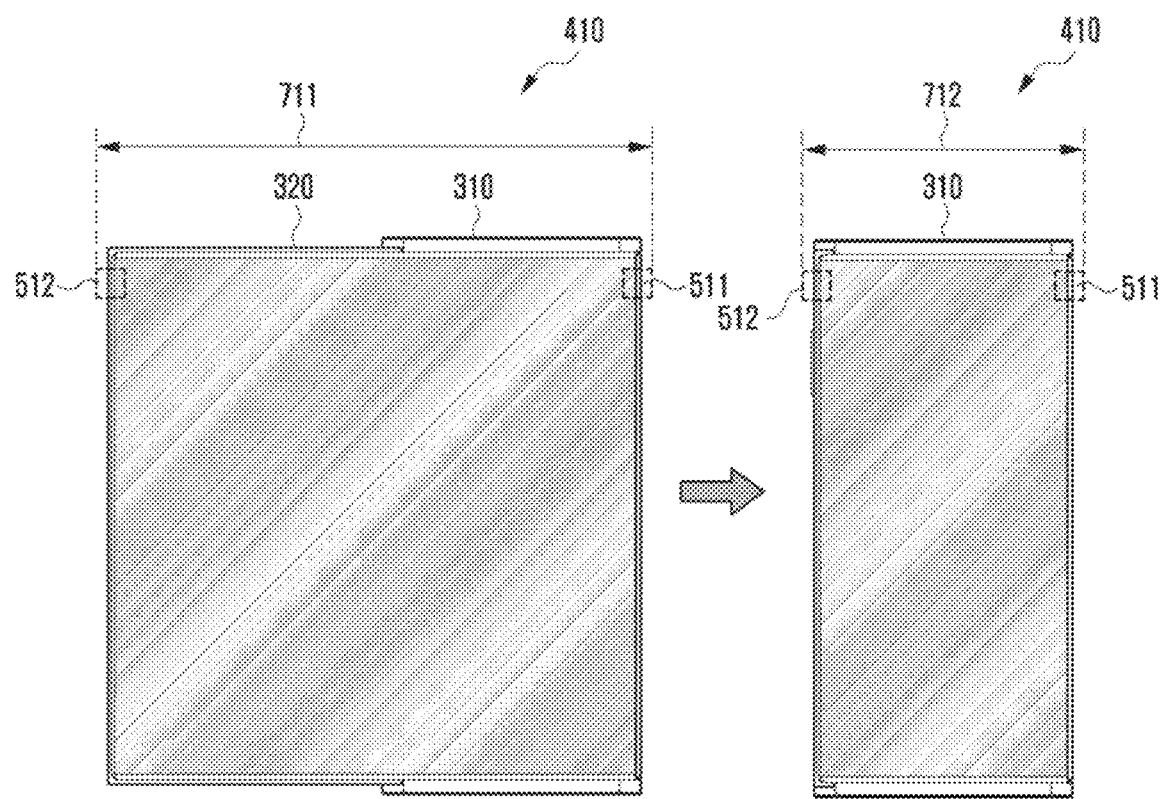

FIG. 7 is a diagram illustrating an embodiment in which an electronic device according to various embodiments of the disclosure changes the operation of short-range wireless communication, based on the degree to which a second housing structure slides in.

According to various embodiments of the disclosure, the electronic device 410 may be implemented in the form of a rollable housing (or a slidable housing) in which a first housing structure (e.g., the first housing 310 in FIG. 3A) and a second housing structure (e.g., the second housing 320 in FIG. 3A) are coupled to be movable in a specified direction and within a specified distance. The first antenna 511 may be implemented inside the first housing structure 310, and the second antenna 512 may be implemented inside the second housing structure 320. When the first housing structure 310 and the second housing structure 320 are in a slide-in or slide-out state, the distance (or isolation) between the first antenna 511 and the second antenna 512 may vary. For example, the distance between the first antenna 511 and the second antenna 512 may decrease when the first housing structure 310 and the second housing structure 320 are in the slide-in state. If the distance between the first housing structure 310 and the second housing structure 320 is reduced in the state in which the electronic device 410 operates in the STR mode (or in the state in which data having a high MCS level is transmitted or received), the STR mode of the electronic device 410 may not be effectively operated as the distance between the first antenna 511 and the second antenna 512 is reduced.

The distance 711 between the first antenna 511 and the second antenna 512 may vary as the second housing 320 slides into (or slides out of) the first housing 310. For example, the distance 711 between the first antenna 511 and the second antenna 512 when the second housing 320 maximally slides out of the first housing 310 may be greater than the distance 712 between the first antenna 511 and the second antenna 512 when the second housing 320 maximally slides into the first housing 310. That is, the distances 711 and 712 may be correlated with the degree to which the second housing 320 slides in (or slides out).

Based on whether or not the degree to which the second housing 320 slides in satisfies a specified condition, the electronic device 410 may control the communication circuit 520 to transmit a signal related to a change in the operation of short-range wireless communication through at least one of the first link 431 and/or the second link 432. The specified condition may include a condition in which the degree to which the second housing 320 slides in is greater than or equal to a specified value.

The signal related to a change in the operation of short-range wireless communication may include information instructing to switch to any one of the STR mode and/or the non-STR mode. The information instructing to switch to any one of the STR mode and/or the non-STR mode may be included in an action frame among management frames defined in IEEE 802.11.

Based on the case where the degree to which the second housing 320 slides in satisfies a specified condition, the electronic device 410 may transmit, to the external electronic device 420, a signal including information instructing to switch to any one of the STR mode and/or the non-STR mode.

The signal related to a change in the operation of short-range wireless communication may include information for changing an MCS level. The information for changing an MCS level (e.g., high efficiency adaptation (HEA) control) may be included in a control frame defined in IEEE 802.11.

According to an embodiment, the information for changing an MCS level may be included in a header of a signal transmitted through a medium access control (MAC) layer.

Based on the case where the degree to which the second housing 320 slides in satisfies a specified condition, the electronic device 410 may transmit a signal for changing the MCS level to the external electronic device 420.

The signal related to a change in the operation of short-range wireless communication may include information for changing an operation mode of short-range wireless communication. The operation mode of short-range wireless communication may include a channel width, the number of space time streams ($N_{STS}$), and/or the number of spatial streams ($N_{SS}$) of short-range wireless communication (or the first link 341 and/or the second link 342). According to an embodiment, the information for changing the operation mode of short-range wireless communication may be included in a header of a signal transmitted through a medium access control (MAC) layer.

Based on the case where the degree to which the second housing 320 slides in satisfies a specified condition, the electronic device 410 may transmit a signal for changing the operation mode of short-range wireless communication to the external electronic device 420.

An electronic device according to various embodiments of the disclosure may include: a foldable housing including a first housing structure and a second housing structure, the first housing structure and the second housing structure being foldable around a hinge structure; a first antenna disposed in the first housing structure; a second antenna disposed in the second housing structure; a communication circuit electrically connected to the first antenna and/or the second antenna, and configured to transmit and receive data through a first link and/or a second link established between an external electronic device and the electronic device; and a processor operatively connected to the communication circuit, wherein the processor may be configured to identify whether or not an angle between the first housing structure and the second housing structure satisfies a specified condition and control the communication circuit to transmit a signal related to a change in the operation of short-range wireless communication through at least one of the first link and the second link, based on whether or not the angle satisfies the specified condition.

In an electronic device according to various embodiments of the disclosure, the processor may be configured to select one of a first mode in which data is transmitted through the first link and in which data is received through the second link, and a second mode in which data is not able to be received through the second link while transmitting data through the first link, based on the case where the angle satisfies the specified condition, and control the communication circuit to transmit the signal including information indicating the selected mode through the at least one link.

In an electronic device according to various embodiments of the disclosure, the processor may be configured to control the communication circuit to transmit a changed signal after changing information indicating the mode, which is included in the signal, to indicate the selected mode.

In an electronic device according to various embodiments of the disclosure, the processor may be configured to change a modulation and coding scheme (MCS), based on the case where the angle satisfies the specified condition.

In an electronic device according to various embodiments of the disclosure, the processor may be configured to change a bandwidth of the first link and/or the second link, based on the case where the angle satisfies the specified condition.

In an electronic device according to various embodiments of the disclosure, the specified condition may include a condition related to a distance between the first antenna and the second antenna.

In an electronic device according to various embodiments of the disclosure, the processor may be configured to determine whether or not to transmit the signal, based on whether or not a difference between a frequency band corresponding to the first link and a frequency band corresponding to the second link is greater than or equal to a specified value.

In an electronic device according to various embodiments of the disclosure, the processor may be configured to determine to not transmit the signal, based on identifying that the difference between the frequency band corresponding to the first link and the frequency band corresponding to the second link is greater than or equal to the specified value.

In an electronic device according to various embodiments of the disclosure, the processor may be configured to determine to not transmit the signal, based on the difference between the frequency band corresponding to the first link and the frequency band corresponding to the second link being less than or equal to the specified value and based on the case the angle satisfies the specified condition.

In an electronic device according to various embodiments of the disclosure, the foldable housing may be a housing in which the distance between the first antenna and the second antenna changes while the first housing structure and the second housing structure is folded or unfolded about the hinge structure.

Figure 8:
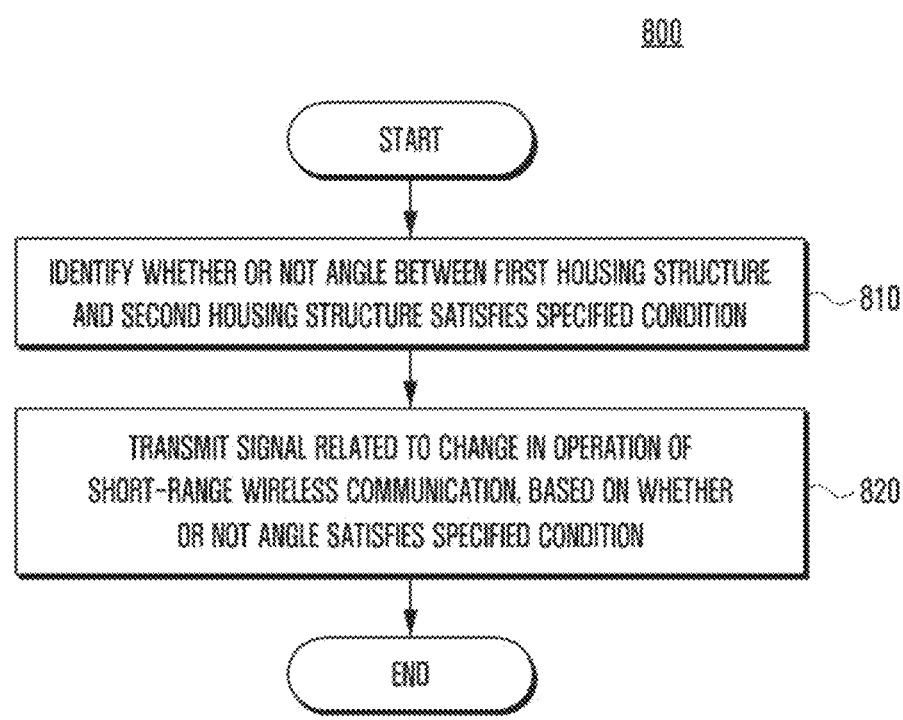
FIG. 8 is an operational flowchart illustrating a method of operating an electronic device according to various embodiments of the disclosure.

FIG. 8 is an operational flowchart illustrating a method 800 of operating an electronic device according to various embodiments of the disclosure.

According to various embodiments of the disclosure, an electronic device (e.g., the electronic device 410 in FIG. 5), in operation 810, may identify whether or not an angle (e.g., the angle 621 in FIG. 6B) between a first housing structure (e.g., the first housing structure 210 in FIG. 2A) and a second housing structure (e.g., the second housing structure 220 in FIG. 2A) satisfies a specified condition.

According to various embodiments of the disclosure, the electronic device 410 may be implemented in the form of a foldable housing in which a first housing structure (e.g., the first housing structure 210 in FIG. 2A) and a second housing structure (e.g., the second housing structure 220 in FIG. 2A) are foldable (or rotatable) through a hinge structure. A first antenna 511 may be implemented inside the first housing structure 210, and a second antenna 512 may be implemented inside the second housing structure 220. When the first housing structure 210 and the second housing structure 220 are folded or unfolded, the distance (or isolation) between the first antenna 511 and the second antenna 512 may vary. For example, the distance between the first antenna 511 and the second antenna 512 may decrease when the first housing structure 210 and the second housing structure 220 are folded. If the first housing structure 210 and the second housing structure 220 are folded in the state in which the electronic device 410 operates in the STR mode (or in the state in which data having a high MCS level is transmitted or received), the STR mode of the electronic device 410 may not be effectively operated as the distance between the first antenna 511 and the second antenna 512 is reduced.

The electronic device 410 may measure an angle between the first housing structure 210 and the second housing structure 220, based on a sensor, and identify whether or not the angle satisfies a specified condition. The specified condition may indicate a condition related to the distance between the first antenna 511 and the second antenna 512. The distance between the first antenna 511 and the second antenna 512 may increase as the angle between the first housing structure 210 and the second housing structure 220 increases. The distance between the first antenna 511 and the second antenna 512 may decrease as the angle between the first housing structure 210 and the second housing structure 220 decreases.

According to various embodiments of the disclosure, in operation 820, the electronic device 410 may transmit a signal related to a change in the operation of short-range wireless communication, based on whether or not the angle 621 satisfies a specified condition.

The signal related to a change in the operation of short-range wireless communication may include information instructing to switch to any one of the STR mode and/or the non-STR mode. The information instructing to switch to any one of the STR mode and/or the non-STR mode may be included in an action frame among management frames defined in IEEE 802.11.

According to an embodiment, the electronic device 410 may control the communication circuit 520 to operate in the STR mode when the foldable housing is in the unfolded state. The electronic device 410 may detect that the foldable housing is folded and identify whether or not the angle of the first housing structure 210 and the second housing structure 220 satisfies a specified condition. The specified condition may include whether or not the angle of the first housing structure 210 and the second housing structure 220 is less than or equal to a specified value. Based on the case where the angle satisfies a specified condition, the electronic device 410 may control the communication circuit 520 to switch from the STR mode to the non-STR mode. The electronic device 410 may control the communication circuit 520 to transmit information indicating switching to the non-STR mode to the external electronic device 420. The electronic device 410 may change a value of a field (e.g., NSTR bitmap) indicating the STR mode, which is included in the management frame (or action frame), to a value indicating the non-STR mode and control the communication circuit 520 to transmit a signal including the changed field to the external electronic device 420. Through the above method, the electronic device 410 may reduce degradation of the quality of short-range wireless communication caused by a decrease in the distance between the first antenna 511 and the second antenna 512 as the foldable housing is folded by switching to the non-STR mode.

According to an embodiment, the electronic device 410 may control the communication circuit 520 to operate in the non-STR mode when the foldable housing is in the folded state. The electronic device 410 may detect that the foldable housing is unfolded and identify whether or not the angle of the first housing structure 210 and the second housing structure 220 satisfies a specified condition. The specified condition may include whether or not the angle of the first housing structure 210 and the second housing structure 220 is greater than or equal to a specified value. Based on the case where the angle satisfies a specified condition, the electronic device 410 may control the communication circuit 520 to switch from the non-STR mode to the STR mode. The electronic device 410 may control the communication circuit 520 to transmit information indicating switching to the STR mode to the external electronic device 420. The electronic device 410 may change a value of a field (e.g., NSTR bitmap) indicating the STR mode, which is included in the management frame (or action frame), to a value indicating the STR mode and control the communication circuit 520 to transmit a signal including the changed field to the external electronic device 420. Through the above method, the electronic device 410 may improve the quality of short-range wireless communication when the distance between the first antenna 511 and the second antenna 512 increases as the foldable housing is unfolded by switching to the STR mode that provides higher performance.

The signal related to a change in the operation of short-range wireless communication may include information for changing an MCS level. The information for changing an MCS level (e.g., high efficiency adaptation (HEA) control) may be included in a control frame defined in IEEE 802.11. According to an embodiment, the information for changing an MCS level may be included in a header of a signal transmitted through a medium access control (MAC) layer.

According to an embodiment, the electronic device 410 may produce data corresponding to a first level of the MCS level in the unfolded state of the foldable housing and control the communication circuit 520 to transmit the produced data. Alternatively or additionally, the electronic device 410 may receive data corresponding to the first level of the MCS level in the unfolded state of the foldable housing and decode the received data. The electronic device 410 may detect that the foldable housing is folded and identify whether or not the angle of the first housing structure 210 and the second housing structure 220 satisfies a specified condition. The specified condition may include whether or not the angle of the first housing structure 210 and the second housing structure 220 is less than or equal to a specified value. Based on the case where the angle satisfies a specified condition, the electronic device 410 may perform a series of operations for setting the MCS level to a second level lower than the first level. The electronic device 410 may control the communication circuit 520 to transmit information for reducing the MCS level to the external electronic device 420. The external electronic device 420 and the electronic device 410 may perform a series of operations for reducing the MCS level. The electronic device 410 may reduce degradation of the quality of short-range wireless communication caused by a decrease in the distance between the first antenna 511 and the second antenna 512 as the foldable housing is folded by transmitting or receiving data having a low MCS level.

According to an embodiment, the electronic device 410 may produce data corresponding to a second level of the MCS level, which is lower than the first level, in the folded state of the foldable housing and control the communication circuit 520 to transmit the produced data. Alternatively or additionally, the electronic device 410 may receive data corresponding to the first level of the MCS level in the unfolded state of the foldable housing and decode the received data. The electronic device 410 may detect that the foldable housing is unfolded and identify whether or not the angle of the first housing structure 210 and the second housing structure 220 satisfies a specified condition. The specified condition may include whether or not the angle of the first housing structure 210 and the second housing structure 220 is greater than or equal to a specified value. Based on the case where the angle satisfies a specified condition, the electronic device 410 may perform a series of operations to increase the MCS level. Through the above method, the electronic device 410 may improve the quality of short-range wireless communication when the distance between the first antenna 511 and the second antenna 512 increases as the foldable housing is unfolded by transmitting and receiving data a higher MCS level that provides higher performance.

The signal related to a change in the operation of short-range wireless communication may include information for changing an operation mode of short-range wireless communication. The operation mode of short-range wireless communication may include a channel width, the number of space time streams ($N_{STS}$), and/or the number of spatial streams ($N_{SS}$) of short-range wireless communication (or the first link 341 and/or the second link 342). According to an embodiment, the information for changing the operation mode of short-range wireless communication may be included in a header of a signal transmitted through a medium access control (MAC) layer.

According to an embodiment, the electronic device 410, in the unfolded state of the foldable housing, may control the communication circuit 520 to operate in a first operation mode (e.g., the number of spatial streams having a first value, the number of space time streams having a second value, and/or a channel width having a first size). The electronic device 410 may detect that the foldable housing is folded and identify whether or not the angle of the first housing structure 210 and the second housing structure 220 satisfies a specified condition. The specified condition may include whether or not the angle of the first housing structure 210 and the second housing structure 220 is less than or equal to a specified value. Based on the case where the angle satisfies a specified condition, the electronic device 410 may perform a series of operations to operate in a second operation mode (e.g., the number of spatial streams having a third value less than the first value, the number of space time streams having a fourth value less than the second value, and/or a channel width having a second size smaller than the first size). The electronic device 410 may control the communication circuit 520 to transmit information indicating that the electronic device 410 operates in the second operation mode to the external electronic device 420. The external electronic device 420 and the electronic device 410 may perform a series of operations to switch from the first operation mode to the second operation mode. The electronic device 410 may reduce degradation of the quality of short-range wireless communication caused by a decrease in the distance between the first antenna 511 and the second antenna 512 as the foldable housing is folded by operating in the second operation mode that requires a smaller distance between the first antenna 511 and the second antenna 512.

According to an embodiment, the electronic device 410, in the folded state of the foldable housing, may control the communication circuit 520 to operate in the second operation mode. The electronic device 410 may detect that the foldable housing is unfolded and identify whether or not the angle of the first housing structure 210 and the second housing structure 220 satisfies a specified condition. The specified condition may include whether or not the angle of the first housing structure 210 and the second housing structure 220 is greater than or equal to a specified value. Based on the case where the angle satisfies a specified condition, the electronic device 410 may perform a series of operations to switch to the first operation mode. The electronic device 410 may control the communication circuit 520 to transmit information indicating that the electronic device 410 operates in the first operation mode to the external electronic device 420. The external electronic device 420 and the electronic device 410 may perform a series of operations to switch from the second operation mode to the first operation mode. Through the above method, the electronic device 410 may improve the quality of short-range wireless communication when the distance between the first antenna 511 and the second antenna 512 increases as the foldable housing is unfolded by operating in the first operation mode that provides higher performance.

Figure 9:
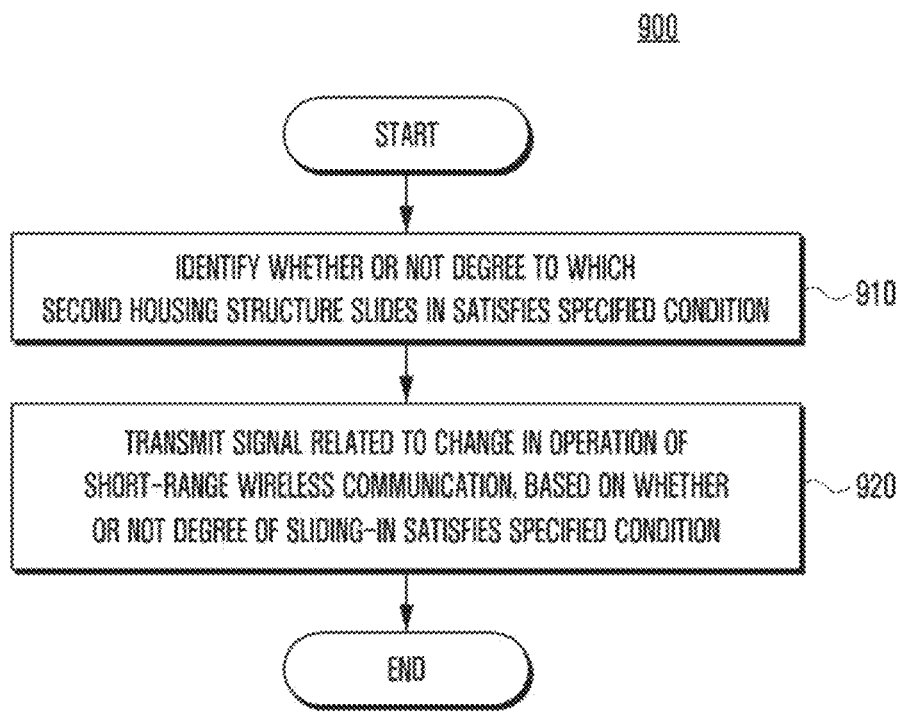
FIG. 9 is an operational flowchart illustrating a method of operating an electronic device according to various embodiments of the disclosure.

FIG. 9 is an operational flowchart illustrating a method 900 of operating an electronic device according to various embodiments of the disclosure.

According to various embodiments of the disclosure, in operation 910, an electronic device (e.g., the electronic device 410 in FIG. 5) may identify whether or not the degree to which a second housing structure (e.g., the second housing structure 320 in FIG. 2A) slides in satisfies a specified condition.

According to various embodiments of the disclosure, the electronic device 410 may be implemented in the form of a rollable housing (or a slidable housing) in which a first housing structure (e.g., the first housing 310 in FIG. 3A) and a second housing structure (e.g., the second housing 320 in FIG. 3A) are coupled to be movable in a specified direction and within a specified distance. A first antenna 511 may be implemented inside the first housing structure 310, and a second antenna 512 may be implemented inside the second housing structure 320. When the first housing structure 310 and the second housing structure 320 are in a slide-in or slide-out state, the distance (or isolation) between the first antenna 511 and the second antenna 512 may vary. For example, the distance between the first antenna 511 and the second antenna 512 may decrease when the first housing structure 310 and the second housing structure 320 are in the slide-in state. If the distance between the first housing structure 310 and the second housing structure 320 is reduced in the state in which the electronic device 410 operates in the STR mode (or in the state in which data having a high MCS level is transmitted or received), the STR mode of the electronic device 410 may not be effectively operated as the distance between the first antenna 511 and the second antenna 512 is reduced.

The electronic device 410 may detect the degree to which the second housing structure 320 slides into (or the degree to which the second housing structure slides out of) the first housing structure 310. The electronic device 410 may detect the degree to which the second housing structure 320 slides in by a method of receiving, from the application processor 120, information related to the degree to which the second housing structure 320 slides in.

The electronic device 410 may measure the degree to which the second housing structure 320 slides in, based on a sensor, and identify whether or not the degree to which the second housing structure 320 slides in satisfies a specified condition. The specified condition may indicate a condition related to the distance between the first antenna 511 and the second antenna 512. The distance between the first antenna 511 and the second antenna 512 may be reduced as the degree to which the second housing structure 320 slides in increases. The distance between the first antenna 511 and the second antenna 512 may increase as the degree to which the second housing structure 320 slides out increases.

According to various embodiments of the disclosure, in operation 920, the electronic device 410, based on whether or not the degree of sliding-in satisfies a specified condition, may transmit a signal related to a change in the operation of short-range wireless communication.

Based on whether or not the degree to which the second housing structure 320 slides in satisfies a specified condition, the electronic device 410 may control the communication circuit 520 to transmit a signal related to a change in the operation of short-range wireless communication through at least one of the first link 431 and/or the second link 432.

The signal related to a change in the operation of short-range wireless communication may include information instructing to switch to any one of the STR mode and/or the non-STR mode. The information instructing to switch to any one of the STR mode and/or the non-STR mode may be included in an action frame among management frames defined in IEEE 802.11.

According to an embodiment, the electronic device 410 may control the communication circuit 520 to operate in the STR mode in the unrolled state of the rollable housing. The electronic device 410 may detect that the second housing structure 320 slides into the first housing structure 310 and identify whether or not the degree to which the second housing structure 320 slides in satisfies a specified condition. The specified condition may include a condition in which the degree to which the second housing structure 320 slides in is greater than or equal to a specified value. Based on the case where the degree of sliding-in satisfies a specified condition, the electronic device 410 may control the communication circuit 520 to switch from the STR mode to the non-STR mode. The electronic device 410 may control the communication circuit 520 to transmit information indicating switching to the non-STR mode to the external electronic device 420. The electronic device 410 may change a value of a field (e.g., NSTR bitmap) indicating the STR mode, which is included in the management frame (or action frame), to a value indicating the non-STR mode and control the communication circuit 520 to transmit a signal including the changed field to the external electronic device 420. Through the above method, the electronic device 410 may reduce degradation of the quality of short-range wireless communication caused by a decrease in the distance between the first antenna 511 and the second antenna 512 as the rollable housing slides in by switching to the non-STR mode.

According to an embodiment, the electronic device 410 may control the communication circuit 520 to operate in the non-STR mode when the rollable housing is in the slide-in state. The electronic device 410 may detect sliding-out of the rollable housing and identify whether or not the degree to which the second housing structure 320 slides in satisfies a specified condition. The specified condition may include a condition in which the degree to which the second housing structure 320 slides in is less than or equal to a specified value. Based on the case where the degree of sliding-in satisfies a specified condition, the electronic device 410 may control the communication circuit 520 to switch from the non-STR mode to the STR mode. The electronic device 410 may control the communication circuit 520 to transmit information indicating switching to the STR mode to the external electronic device 420. The electronic device 410 may change a value of a field (e.g., NSTR bitmap) indicating the STR mode, which is included in the management frame (or action frame), to a value indicating the STR mode and control the communication circuit 520 to transmit a signal including the changed field to the external electronic device 420. Through the above method, the electronic device 410 may improve the quality of short-range wireless communication when the distance between the first antenna 511 and the second antenna 512 increases as the rollable housing slides out by switching to the STR mode that provides higher performance.

The signal related to a change in the operation of short-range wireless communication may include information for changing an MCS level. The information for changing an MCS level (e.g., high efficiency adaptation (HEA) control) may be included in a control frame defined in IEEE 802.11. According to an embodiment, the information for changing an MCS level may be included in a header of a signal transmitted through a medium access control (MAC) layer.

According to an embodiment, the electronic device 410 may produce data corresponding to a first level of the MCS level in the slide-out state of the rollable housing and control the communication circuit 520 to transmit the produced data. Alternatively or additionally, the electronic device 410 may receive data corresponding to the first level of the MCS level in the slide-out state of the rollable housing and decode the received data. The electronic device 410 may detect that the second housing structure 320 slides in and identify whether or not the degree to which the second housing structure 320 slides in satisfies a specified condition. The specified condition may include whether or not the degree to which the second housing structure 320 slides in is greater than or equal to a specified value. Based on the case where the degree of sliding-in satisfies a specified condition, the electronic device 410 may perform a series of operations to set the MCS level to a second level lower than the first level. The electronic device 410 may control the communication circuit 520 to transmit information for reducing the MCS level to the external electronic device 420. The external electronic device 420 and the electronic device 410 may perform a series of operations to reduce the MCS level. The electronic device 410 may reduce degradation of the quality of short-range wireless communication caused by a decrease in the distance between the first antenna 511 and the second antenna 512 as the rollable housing slides in by transmitting or receiving data having a low MCS level.

According to an embodiment, the electronic device 410 may produce data corresponding to a second level of the MCS level, which is lower than the first level, when the rollable housing is in the slide-in state, and control the communication circuit 520 to transmit the produced data. Alternatively or additionally, the electronic device 410 may receive data corresponding to the second level of the MCS level when the rollable housing is in the slide-in state and decode the received data. The electronic device 410 may detect that the second housing structure 320 slides out and identify whether or not the degree to which the second housing structure 320 slides in satisfies a specified condition. The specified condition may include whether or not the degree to which the second housing structure 320 slides in is less than or equal to a specified value. Based on the case where the degree of sliding-in satisfies a specified condition, the electronic device 410 may perform a series of operations to increase the MCS level. Through the above method, the electronic device 410 may improve the quality of short-range wireless communication when the distance between the first antenna 511 and the second antenna 512 increases as the rollable housing slides out by transmitting and receiving data a higher MCS level that provides higher performance.

The signal related to a change in the operation of short-range wireless communication may include information for changing an operation mode of short-range wireless communication. The operation mode of short-range wireless communication may include a channel width, the number of space time streams ($N_{STS}$), and/or the number of spatial streams ($N_{SS}$) of short-range wireless communication (or the first link 341 and/or the second link 342). According to an embodiment, the information for changing the operation mode of short-range wireless communication may be included in a header of a signal transmitted through a medium access control (MAC) layer.

According to an embodiment, the electronic device 410, when the rollable housing is in the slide-out state, may control the communication circuit 520 to operate in a first operation mode (e.g., the number of spatial streams having a first value, the number of space time streams having a second value, and/or a channel width having a first size). The electronic device 410 may detect that the second housing structure 320 slides out and identify whether or not the degree to which the second housing structure 320 slides in satisfies a specified condition. The specified condition may include whether or not the degree to which the second housing structure 320 slides in is greater than or equal to a specified value. Based on the case where the angle satisfies a specified condition, the electronic device 410 may perform a series of operations to operate in a second operation mode (e.g., the number of spatial streams having a third value less than the first value, the number of space time streams having a fourth value less than the second value, and/or a channel width having a second size smaller than the first size). The electronic device 410 may control the communication circuit 520 to transmit information indicating that the electronic device 410 operates in the second operation mode to the external electronic device 420. The external electronic device 420 and the electronic device 410 may perform a series of operations to switch from the first operation mode to the second operation mode. The electronic device 410 may reduce degradation of the quality of short-range wireless communication caused by a decrease in the distance between the first antenna 511 and the second antenna 512 as the rollable housing slides in by operating in the second operation mode that requires a smaller distance between the first antenna 511 and the second antenna 512.

According to an embodiment, the electronic device 410 may control the communication circuit 520 to operate in the second operation mode when the rollable housing is in the slide-in state. The electronic device 410 may detect that the second housing structure 320 slides out and identify whether or not the degree to which the second housing structure 320 slides in satisfies a specified condition. The specified condition may include whether or not the degree to which the second housing structure 320 slides in is less than or equal to a specified value. Based on the case where the degree of sliding-in satisfies a specified condition, the electronic device 410 may perform a series of operations to switch to the first operation mode. The electronic device 410 may control the communication circuit 520 to transmit information indicating that the electronic device 410 operates in the first operation mode to the external electronic device 420. The external electronic device 420 and the electronic device 410 may perform a series of operations to switch from the second operation mode to the first operation mode. Through the above method, the electronic device 410 may improve the quality of short-range wireless communication when the distance between the first antenna 511 and the second antenna 512 increases as the rollable housing slides out by operating in the first operation mode that provides higher performance.

A method of operating an electronic device according to various embodiments of the disclosure may include identifying whether or not an angle between a first housing structure including a first antenna and a second housing structure including a second antenna satisfies a specified condition and transmitting a signal related to a change in the operation of short-range wireless communication established between an external electronic device and the electronic device through at least one of a first link and a second link, based on whether or not the angle satisfies the specified condition.

The method of operating an electronic device according to various embodiments of the disclosure may further include selecting one of a first mode in which data is transmitted through the first link and in which data is received through the second link, and a second mode in which data is not able to be received through the second link while transmitting data through the first link, based on the case where the angle satisfies the specified condition, and transmitting the signal including information indicating the selected mode through the at least one link.

The method of operating an electronic device according to various embodiments of the disclosure may further include transmitting a changed signal after changing information indicating the mode, which is included in the signal, to indicate the selected mode.

The method of operating an electronic device according to various embodiments of the disclosure may further include changing a modulation and coding scheme (MCS), based on the case where the angle satisfies the specified condition.

The method of operating an electronic device according to various embodiments of the disclosure may further include changing a bandwidth of the first link and/or the second link, based on the case where the angle satisfies the specified condition.

In the method of operating an electronic device according to various embodiments of the disclosure, the specified condition may include a condition related to a distance between the first antenna and the second antenna.

The method of operating an electronic device according to various embodiments of the disclosure may further include determining whether or not to transmit the signal, based on whether or not a difference between a frequency band corresponding to the first link and a frequency band corresponding to the second link is greater than or equal to a specified value.

In the method of operating an electronic device according to various embodiments of the disclosure, the determining whether or not to transmit the signal may include determining to not transmit the signal, based on identifying that the difference between the frequency band corresponding to the first link and the frequency band corresponding to the second link is greater than or equal to the specified value.

In the method of operating an electronic device according to various embodiments of the disclosure, the determining whether or not to transmit the signal may include determining to not transmit the signal, based on the difference between the frequency band corresponding to the first link and the frequency band corresponding to the second link being less than or equal to the specified value and based on the case the angle satisfies the specified condition.

In the method of operating an electronic device according to various embodiments of the disclosure, the electronic device may include a foldable housing in which the distance between the first antenna and the second antenna changes while the first housing structure and the second housing structure is folded or unfolded about a hinge structure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a hinge structure;
   a foldable housing comprising a first housing structure and a second housing structure that are configured to be foldable relative to each other around the hinge structure;
   a first antenna disposed in the first housing structure;
   a second antenna disposed in the second housing structure;
   a communication circuit electrically connected to the first antenna and the second antenna, and configured to transmit and receive data through a first link and a second link established between an external electronic device and the electronic device; and
   a processor operatively connected to the communication circuit,
   wherein the processor is configured to:
      identify whether an angle between the first housing structure and the second housing structure satisfies a specified condition, the specified condition being related to a distance between the first antenna and the second antenna,
      control the communication circuit to transmit, to the external electronic device through at least one of the first link and the second link, a signal related to a change in an operation of short-range wireless communication, based at least on the angle satisfying the specified condition, the signal instructing the external electronic device to switch to the changed operation mode, and
      perform, through the first antenna and the second antenna, the operation of the short-range wireless communication in the changed operation mode.

2. The electronic device of claim 1, wherein the processor is further configured to:
   select a mode from among a first mode in which data is transmitted through the first link and in which data is received through the second link, and a second mode in which data is prevented from being received through the second link while transmitting data through the first link, based on identifying that the angle satisfies the specified condition; and control the communication circuit to transmit, through the at least one of the first link and the second link, the signal comprising information indicating the selected mode.

3. The electronic device of claim 2, wherein the processor is further configured to control the communication circuit to transmit, through the at least one of the first link and the second link, a changed signal after changing information indicating the mode, which is included in the signal, to indicate the selected mode.

4. The electronic device of claim 1, wherein the processor is further configured to change a modulation and coding scheme (MCS) of the at least one of the first link and the second link, based on that the angle satisfies the specified condition.

5. The electronic device of claim 1, wherein the processor is further configured to change a bandwidth of the at least one of the first link and the second link, based on that the angle satisfies the specified condition.

6. The electronic device of claim 1, wherein the specified condition comprises a condition related to the distance between the first antenna and the second antenna.

7. The electronic device of claim 1, wherein the processor is further configured to determine whether to transmit the signal, based on whether a difference between a first frequency band corresponding to the first link and a second frequency band corresponding to the second link is greater than or equal to a specified value.

8. The electronic device of claim 7, wherein the processor is further configured to prevent transmission of the signal, based on identifying that the difference between the first frequency band and the second frequency band is greater than or equal to the specified value.

9. The electronic device of claim 7, wherein the processor is further configured to prevent transmission of the signal, based on that the difference between the first frequency band corresponding to the first link and the second frequency band is less than the specified value and the angle satisfies the specified condition.

10. The electronic device of claim 1, wherein the distance between the first antenna and the second antenna changes according to a change in the angle between the first housing structure and the second housing structure due to the first housing structure and the second housing structure being folded or unfolded about the hinge structure.

11. A method of operating an electronic device, the method comprising:
identifying whether an angle between a first housing structure comprising a first antenna and a second housing structure comprising a second antenna satisfies a specified condition, the specified condition being related to a distance between the first antenna and the second antenna;
transmitting, to an external electronic device, a signal related to a change in an operation of short-range wireless communication established between the external electronic device and the electronic device through at least one of a first link and a second link, based at least on the angle satisfying the specified condition, the signal instructing the external electronic device to switch to the changed operation mode; and
performing, through the first antenna and the second antenna, the operation of the short-range wireless communication in the changed operation mode.

12. The method of claim 11, further comprising:
selecting a mode from among a first mode in which data is transmitted through the first link and in which data is received through the second link, and a second mode in which data is prevented from being received through the second link while transmitting data through the first link, based on that the angle satisfies the specified condition; and
transmitting, through the at least one of the first link and the second link, the signal comprising information indicating the selected mode.

13. The method of claim 12, further comprising transmitting, through the at least one of the first link and the second link, a changed signal after changing information indicating the mode, which is included in the signal, to indicate the selected mode.

14. The method of claim 11, further comprising changing a modulation and coding scheme (MCS) of the at least one of the first link and the second link, based on that the angle satisfies the specified condition.

15. The method of claim 11, further comprising changing a bandwidth of the at least one of the first link and the second link, based on that the angle satisfies the specified condition.

16. The method of claim 11, wherein the specified condition comprises a condition related to the distance between the first antenna and the second antenna.

17. The method of claim 11, further comprising determining whether to transmit the signal, based on whether a difference between a first frequency band corresponding to the first link and a second frequency band corresponding to the second link is greater than or equal to a specified value.

18. The method of claim 17, wherein the determining of whether to transmit the signal comprises preventing transmission of the signal, based on identifying that the difference between the first frequency band and the second frequency band is greater than or equal to the specified value.

19. The method of claim 17, wherein the determining of whether to transmit the signal comprises preventing transmission of the signal, based on that the difference between the first frequency band and the second frequency band is less than the specified value and identifying that the angle satisfies the specified condition.

20. The method of claim 11, wherein the distance between the first antenna and the second antenna changes according to a change in the angle between the first housing structure and the second housing structure due to the first housing structure and the second housing structure being folded or unfolded about a hinge structure of the electronic device.

* * * * *